US010034435B2

(12) United States Patent
Helene et al.

(10) Patent No.: US 10,034,435 B2
(45) Date of Patent: Jul. 31, 2018

(54) SELF-SUSTAINING ARTIFICIALLY CONTROLLABLE ENVIRONMENT WITHIN A STORAGE CONTAINER OR OTHER ENCLOSED SPACE

(71) Applicant: GreenTech Agro LLC, New York, NY (US)

(72) Inventors: Alan J. Helene, New York, NY (US); Glenn Behrman, Miami, FL (US)

(73) Assignee: GREENTECH AGRO LLC, New York, NY (US)

( * ) Notice: Subject to any disclaimer, the term of this patent is extended or adjusted under 35 U.S.C. 154(b) by 210 days.

(21) Appl. No.: 14/063,899

(22) Filed: Oct. 25, 2013

(65) Prior Publication Data

US 2014/0115958 A1    May 1, 2014

Related U.S. Application Data

(60) Provisional application No. 61/719,072, filed on Oct. 26, 2012.

(51) Int. Cl.
*A01G 9/24*    (2006.01)
*A01G 9/14*    (2006.01)
*A01G 31/06*   (2006.01)

(52) U.S. Cl.
CPC ............... *A01G 9/24* (2013.01); *A01G 9/14* (2013.01); *A01G 31/06* (2013.01); *Y02A 40/252* (2018.01); *Y02A 40/264* (2018.01); *Y02P 60/216* (2015.11)

(58) Field of Classification Search
CPC . A01G 1/001; A01G 9/14; A01G 9/16; A01G 9/24; A01G 31/06

(Continued)

(56) References Cited

U.S. PATENT DOCUMENTS 4,146,993 A * 4/1979 Freeman, Sr. ......... A01G 7/045
                                                                47/17
4,255,897 A * 3/1981 Ruthner ................. A01G 7/045
                                                                47/17

(Continued)

FOREIGN PATENT DOCUMENTS

GB          2426015 A       11/2006
KR      2011/0009235 U       9/2011

(Continued)

OTHER PUBLICATIONS

International Search Report dated Jan. 29, 2014 in connection with International Patent Application No. PCT/US2013/048984, 4 pages.

(Continued)

*Primary Examiner* — David J Parsley
*Assistant Examiner* — Danielle A Clerkley

(57) ABSTRACT

A system includes an enclosed space defining a controllable environment chamber. The system also includes at least one monitoring device configured to measure multiple characteristics of an environment within the chamber. The system further includes multiple actuators configured to alter the characteristics of the environment within the chamber. The enclosed space includes at least one rack system configured to be placed within the enclosed space. Each rack system includes multiple layers configured to receive multiple plants to be grown in the chamber. The actuators are configured to adjust the characteristics of the environment within the chamber to condition the environment based on the plants to be grown in the chamber.

26 Claims, 13 Drawing Sheets

(58) Field of Classification Search
USPC .................................... 47/17, 58.1 R, 60, 61
See application file for complete search history.

(56) References Cited

U.S. PATENT DOCUMENTS

| | | | | |
|---|---|---|---|---|
| 4,567,732 | A * | 2/1986 | Landstrom | A01G 9/246 47/17 |
| 4,569,150 | A | 2/1986 | Carlson et al. | |
| 5,283,974 | A * | 2/1994 | Graf, Jr. | A01G 9/16 47/60 |
| 5,493,808 | A * | 2/1996 | Munday | A01G 9/246 454/230 |
| 6,508,033 | B2 * | 1/2003 | Hessel | A01B 79/005 47/60 |
| 6,554,450 | B2 * | 4/2003 | Fang | A01G 7/045 315/185 R |
| 8,234,812 | B1 | 8/2012 | Colless et al. | |
| 2002/0020441 | A1 * | 2/2002 | Addink | A01G 25/167 137/78.2 |
| 2002/0088173 | A1 | 7/2002 | Hessel et al. | |
| 2003/0101645 | A1 | 6/2003 | Cole et al. | |
| 2008/0203178 | A1 * | 8/2008 | Barrett | A01K 1/0047 236/49.3 |
| 2009/0300983 | A1 | 12/2009 | Tilford et al. | |
| 2009/0307973 | A1 * | 12/2009 | Adams | A01G 31/06 47/62 C |
| 2011/0232186 | A1 | 9/2011 | Lewis | |
| 2014/0020292 | A1 * | 1/2014 | McNamara | A01G 9/246 47/66.6 |

FOREIGN PATENT DOCUMENTS

| | | |
|---|---|---|
| WO | WO 2005/079557 A1 | 9/2005 |
| WO | WO 2011/047436 A1 | 4/2011 |
| WO | WO 2014/005156 A2 | 1/2014 |

OTHER PUBLICATIONS

Notification of Transmittal of the International Search Report and The Written Opinion of the International Searching Authority, or the Declaration dated Mar. 21, 2014 in connection with International Patent Application No. PCT/US2013/066948.

Extended European Search Report dated May 19, 2016 in connection with European Application No. 13848579.2, 10 pages.

* cited by examiner

SELF-SUSTAINING ARTIFICIALLY CONTROLLABLE ENVIRONMENT WITHIN A STORAGE CONTAINER OR OTHER ENCLOSED SPACE

CROSS-REFERENCE TO RELATED APPLICATION AND PRIORITY CLAIM

This application claims priority under 35 U.S.C. § 119(e) to U.S. Provisional Patent Application No. 61/719,072 filed on Oct. 26, 2012. This provisional application is hereby incorporated by reference in its entirety.

TECHNICAL FIELD

This disclosure generally relates to an artificially controllable environment and more specifically to a self-sustaining artificially controllable environment within a storage container or other enclosed space.

BACKGROUND

Greenhouses have provided a means for producing food crops and flowering plants in temperate or cold climate zones where seasonal changes negatively affect the propagation and production of plants. Greenhouses have been constructed to shelter plants from temperatures below which they could not survive. Greenhouses typically depend on natural light and usually produce plants on one level. Shelter and controlled temperatures preserve the life of the plants but do not control the yield of the plants growing within such greenhouses.

SUMMARY

This disclosure provides a self-sustaining artificially controllable environment within a storage container or other enclosed space.

In a first embodiment, a system includes an enclosed space defining a controllable environment chamber. The system also includes at least one monitoring device configured to measure multiple characteristics of an environment within the chamber. The system further includes multiple actuators configured to alter the characteristics of the environment within the chamber. The enclosed space includes at least one rack system configured to be placed within the enclosed space. Each rack system includes multiple layers configured to receive multiple plants to be grown in the chamber. The actuators are configured to adjust the characteristics of the environment within the chamber to condition the environment based on the plants to be grown in the chamber.

In a second embodiment, a method includes obtaining measurements of multiple characteristics of an environment within a controllable environment chamber of an enclosed space. The enclosed space includes at least one rack system configured to be placed within the enclosed space. Each rack system includes multiple layers configured to receive multiple plants to be grown in the chamber. The method also includes adjusting the characteristics of the environment within the chamber based on the measurements using multiple actuators. The multiple actuators are configured to adjust the characteristics of the environment within the chamber to condition the environment based on the plants to be grown in the chamber.

In a third embodiment, a non-transitory computer readable medium embodies a computer program. The computer program includes computer readable program code for receiving measurements of multiple characteristics of an environment within a controllable environment chamber of an enclosed space. The enclosed space includes at least one rack system configured to be placed within the enclosed space. Each rack system includes multiple layers configured to receive multiple plants to be grown in the chamber. The computer program also includes computer readable program code for controlling operation of multiple actuators to adjust the characteristics of the environment within the chamber based on the measurements and based on the plants to be grown in the chamber.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" and the phrase "control system" mean any device, system or part thereof that monitors and controls at least one operation. A controller or control system may be implemented in hardware or a combination of hardware and firmware and/or software. It should be noted that the functionality associated with any particular controller or control system may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Definitions for additional words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 15, described below, and the various embodiments used to describe the principles of this disclosure are by way of illustration only and should not be construed in any way to limit the scope of the disclosure. The drawings are not necessarily drawn to scale. The numerous innovative teachings of the present application will be described with reference to example non-limiting embodiments. It should be understood at the outset that, although example embodiments are illustrated below and in the accompanying figures, the present invention may be implemented using any number of techniques, whether currently known or not. The present invention should in no way be limited to the example implementations, drawings, and techniques illustrated below.

Container Exterior

Figure 1:
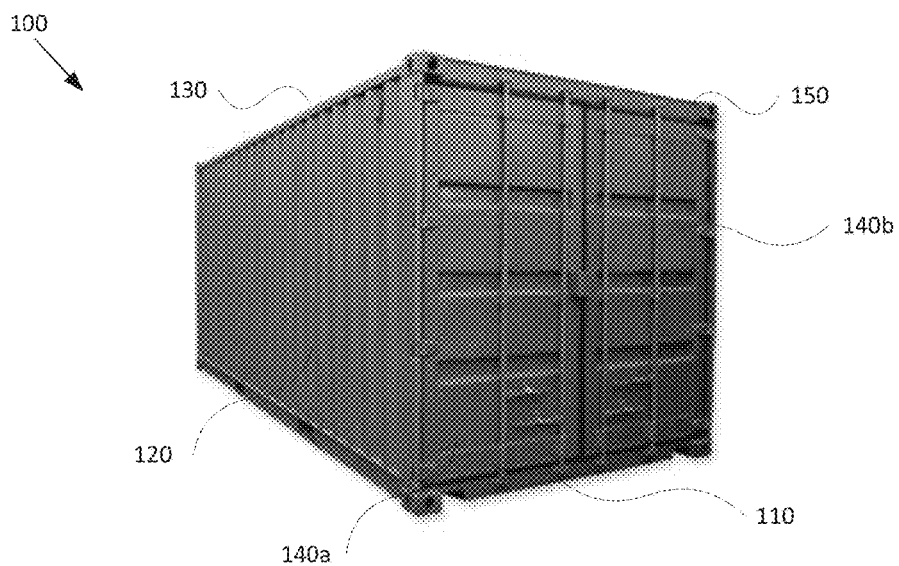
FIGS. 1, 2A, and 2B illustrate the exteriors of example containers according to this disclosure.
Figure 2A:
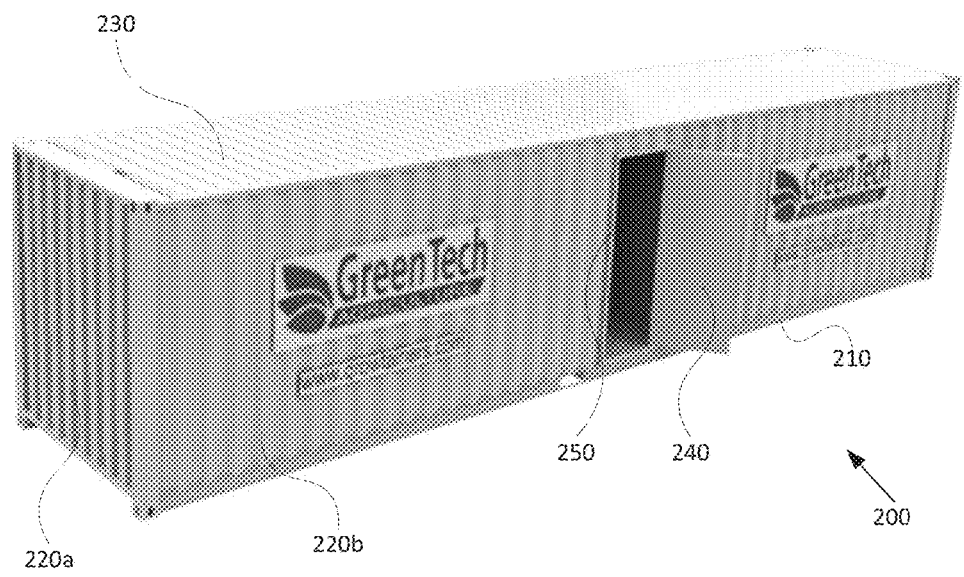
Figure 2B:
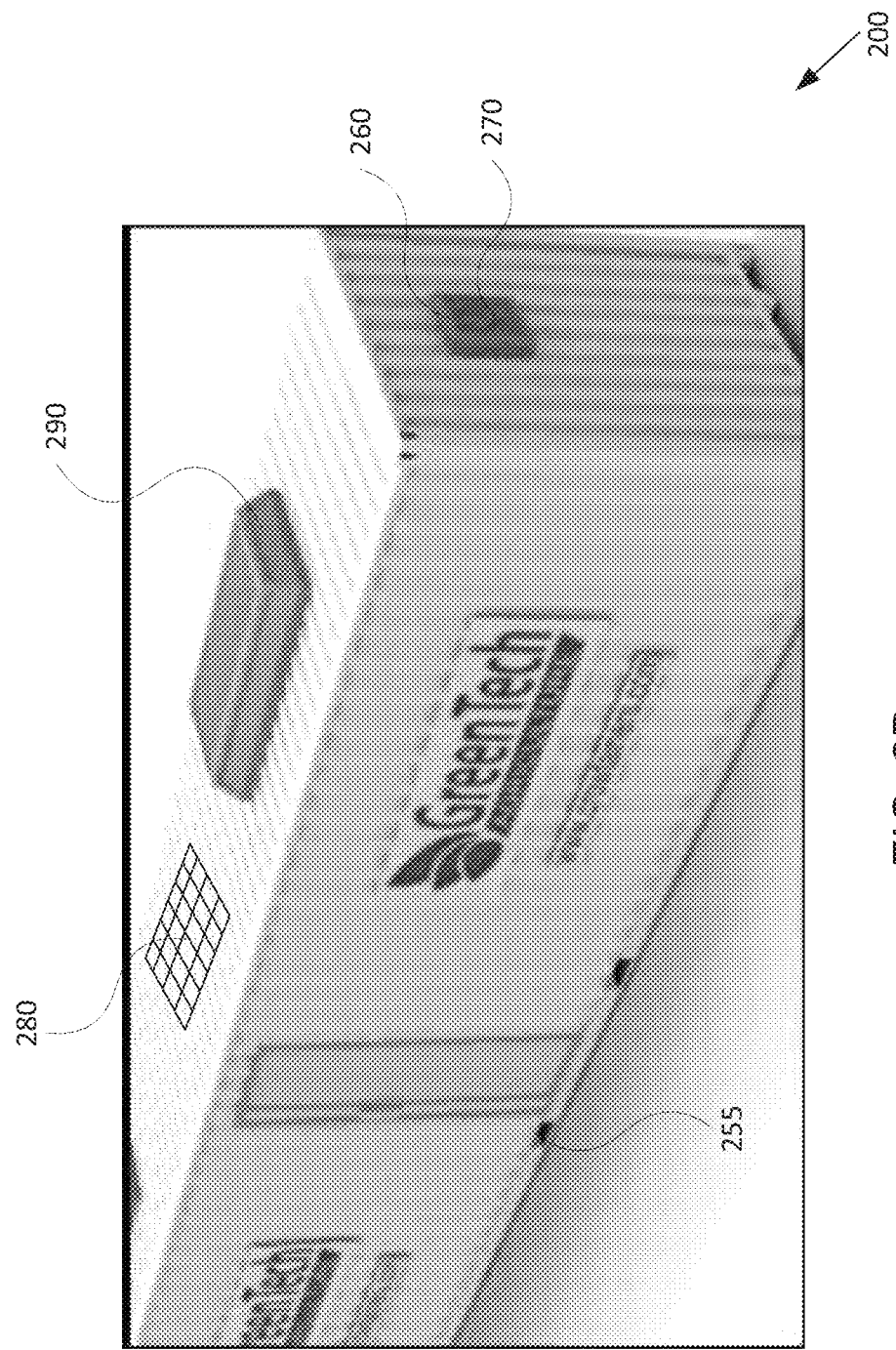

FIGS. 1, 2A, and 2B illustrate the exteriors of example containers 100 and 200 according to this disclosure. Each container 100 and 200 includes a modular plant production space with at least one controllable environment for growing a variety of horticultural and agricultural products. A controllable environment can cause plants to produce higher yields in a shorter time than conventional production methods. Supplies necessary for plant growth, such as water, nutrients, and light, are stored, generated, and/or provided within each container 100 and 200. An environment within the container 100 or 200 is monitored and controlled by a control system. Although certain details will be provided with reference to the components of the exteriors of the containers 100 and 200, it should be understood that other embodiments may include more, less, or different components.

As shown in FIG. 1, the container 100 includes a bottom cover 110, a plurality of side walls 120, a top cover 130, and doors 140a-140b, which collectively enclose a three dimensional (3D) space. The doors 140a-140b are attached to a door frame 150. When the doors 140a-140b are closed, the doors 140a-140b can be sealed to create a controllable environment within the container 100, sealing out ambient conditions outside the container 100. However, a seal is not necessarily required for the doors 140a-140b since other doors within the container 100 could be sealed to create controllable environments. The door frame 150 is adapted so that when a door is open, a person standing upright may walk into the interior of the container 100, and equipment may pass through the door frame 150. In other embodiments, the doors 140a-140b and the door frame 150 can be omitted, and the container 100 includes an insulated wall in place of the doors.

In this example, the container 100 represents a shipping container (such as a cargo shipping container). In particular embodiments, the container 100 has a rectangular shape with two shorter-length side walls (referred to as front and rear walls) and two longer-length side walls. Various embodiments of the container 100 include different dimensions or different shapes. In particular embodiments, the container 100 is twenty to fifty-three feet long. Multiple containers 100 may or may not be stackable on top of each other. In particular embodiments, the containers 100 can be stacked twelve high. The location of a container 100 could vary, and example locations can include being fixed to a plot of land (such as part of a farm), permanently fixed or temporarily mounted to a flatbed vehicle (such as a flatbed truck or flatbed train car for movement), or stacked on a barge or other vessel. In FIG. 1, the door frame 150 surrounds the rear perimeter of the container 100, and the doors 140a-140b are attached to the door frame 150 by hinges. The doors 140a-140b pivot in opposite directions to swing open. Each of the doors 140a-140b provides entry into the 3D space within the container 100. Note, however, that the container 100 could include one door, and the size(s) and location(s) of the door(s) can vary.

The interior and exterior surfaces of the container 100 can include one or more coatings of paint, such as an insulating paint. In some embodiments, the insulating paint includes a ceramic insulating paint, such as those developed by the National Aeronautics and Space Administration (NASA). In particular embodiments, the thickness of the paint is about 20 to about 30 millimeters (mm). In other embodiments, the interior surface of the container 100 contains a surrounding layer of insulation that does not include insulating paint.

As shown in FIGS. 2A and 2B, the container 200 includes a bottom cover 210, a plurality of side walls 220a-220b, a top cover 230, and a door 240 and a door frame 250 within a longer side wall 220b. The door 240 is shown here as being roughly in the middle of the longer side wall 220b, although the door could be placed elsewhere along any suitable side wall. When the door 240 is closed and sealed, a controllable environment can be created within the container 200, sealing out ambient conditions outside the container 200. Again, a seal is not necessarily required for the door 240 since other doors within the container 200 could be sealed to create controllable environments. The container 200 can include insulation or insulating paint.

As shown in FIG. 2B, the container 200 also includes a plurality of lift ports 255. When the container 200 is to be moved, teeth, straps, or other portions of a lifting machine are inserted into the lift ports 255 to grab the container 200 and to prevent dropping of the container 200. The container 200 also includes one or more heating, ventilation, and air conditioning (HVAC) units 260. Certain HVAC units 260 may include condensing coils 270 that require exposure to the ambient environment. By exposing the condensing coils 270 of an HVAC unit 260, heat removed from the space within the container 200 is released outside the container 200. In particular embodiments, an HVAC unit 260 includes a humidifier, dehumidifier, or other equipment that controls the humidity of an environment within the container 200. As a particular example, a humidity-controlling HVAC unit 260 could represent a four-ton wall mounted system.

The container 200 further includes a power source 280. The power source 280 is coupled to electrical components within the container 200 and provides power to those components, such as through mutual coupling to a wiring system within the container 200. Any suitable source of electrical power could be used here. In the illustrated example, the power source 280 includes at least one solar panel. Depending (among other things) on the amount of power needed and the efficiency of the solar panels, the container 200 could include one or multiple solar panels, even solar panels covering the entire roof and/or other surface(s) of the container 200. In other embodiments, the power source 280 could be replaced or supplemented by an electrical port, such as an electrical outlet, that can be connected to a source of electrical power external to the container 200. External sources could include a local utility system's distribution grid, a generator, a remote solar array, or other electricity source. In these embodiments, the electrical port could be placed in any suitable location, such as low on a side wall 220a-220b. The type of electrical port used could vary depending on a number of factors, such as the source providing electrical power and the country in which the container 200 is used. Any other suitable source(s) of power could be used in the container 200, such as one or more batteries or fuel cells. Components such as solar cells could be mounted to the exterior of the container 200 or on structures on or near the container 200, such as poles or other structures holding multiple solar cells.

In this example, the container 200 further includes one or more exhaust systems 290. In some embodiments, each exhaust system 290 could include an exhaust fan and a louver. The exhaust system 290 can be coupled to and controlled by a control system within or remote from the container 200. For example, an exhaust system 290 can receive signals from the control system and operate to vent gases from a controlled chamber into the ambient environment. In this example, the exhaust system 290 is placed on the outside of the container. In other embodiments, however, the exhaust fan could be placed within the container 200, and the louver could be placed on or flush with the top or side surface of the container 200.

Note that while two containers 100 and 200 are shown here, features of one container could be used in the other container. For instance, the container 200 could include doors 140a-140b on the front or rear side wall of the container 200. As another example, the container 100 could include the components 255-290 shown in FIG. 2B.

Also note that the containers 100 and 200 could be designed to maintain ISO or other certification. ISO certification may require that there be no components projecting from the outer surfaces of a container, which can be done to ensure that containers are stackable and can be handled by conventional lift equipment. In these embodiments, various components (such as components 260-290) may be removable for transport, meaning the components 260-290 can be disconnected from the container 200 and later placed back onto the container 200 after transport is complete. In other embodiments, the components 260-290 may be designed to be retractable or flush with the top and/or side surface(s) of the container 200.

Container Interior

Figure 3:
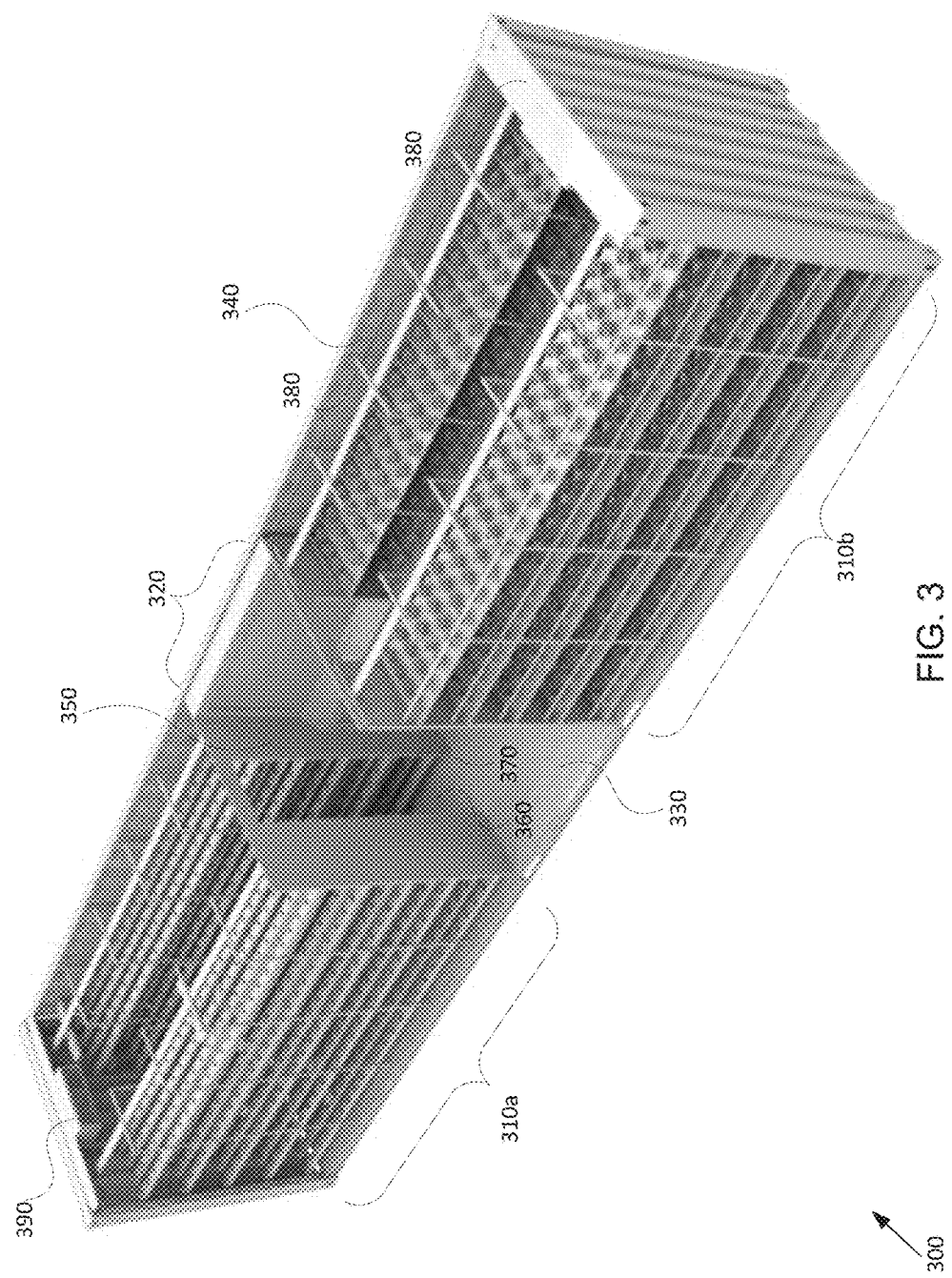
FIGS. 3 through 10 illustrate the interiors of example containers and associated components according to this disclosure.
Figure 4:
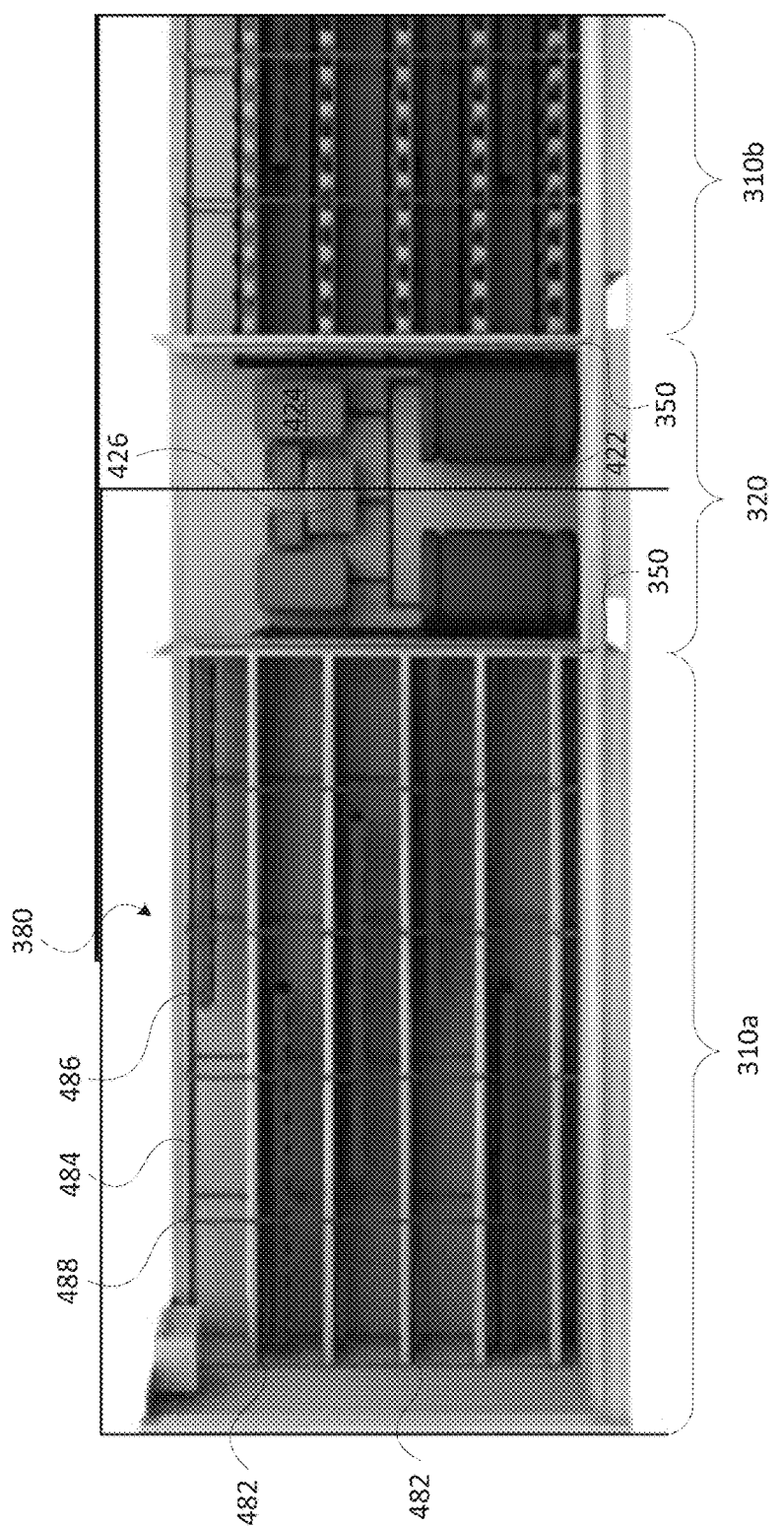
Figure 5:
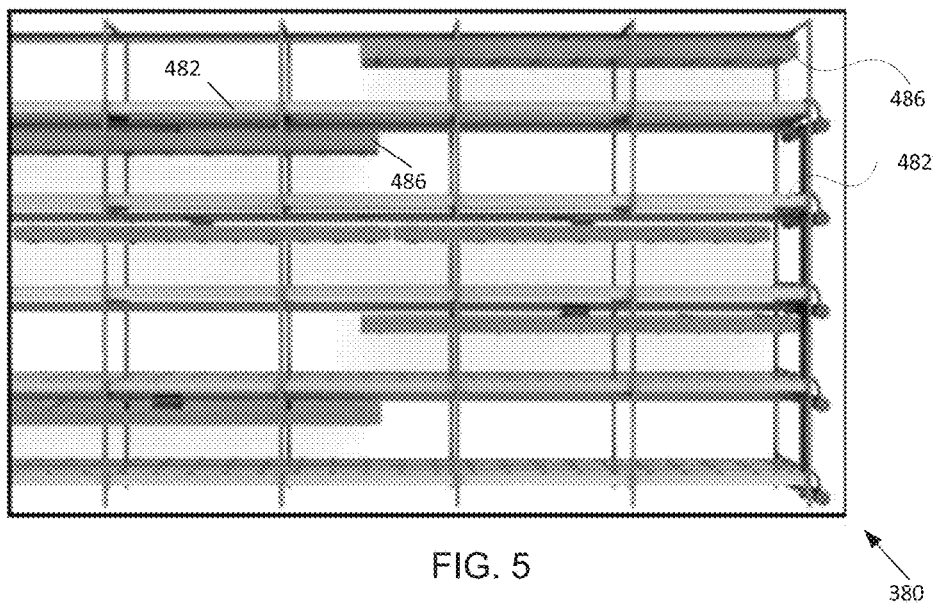
Figure 6:
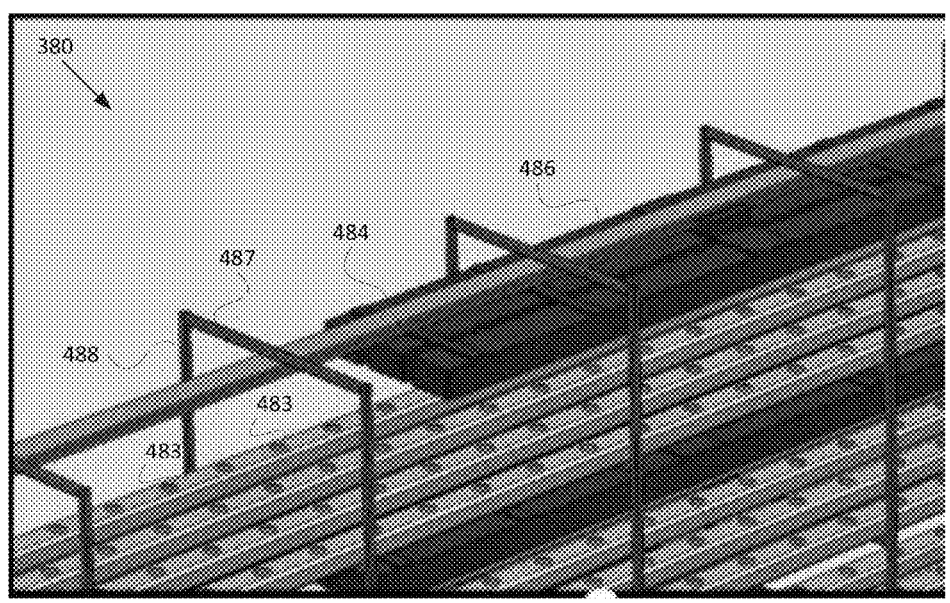
Figure 7:
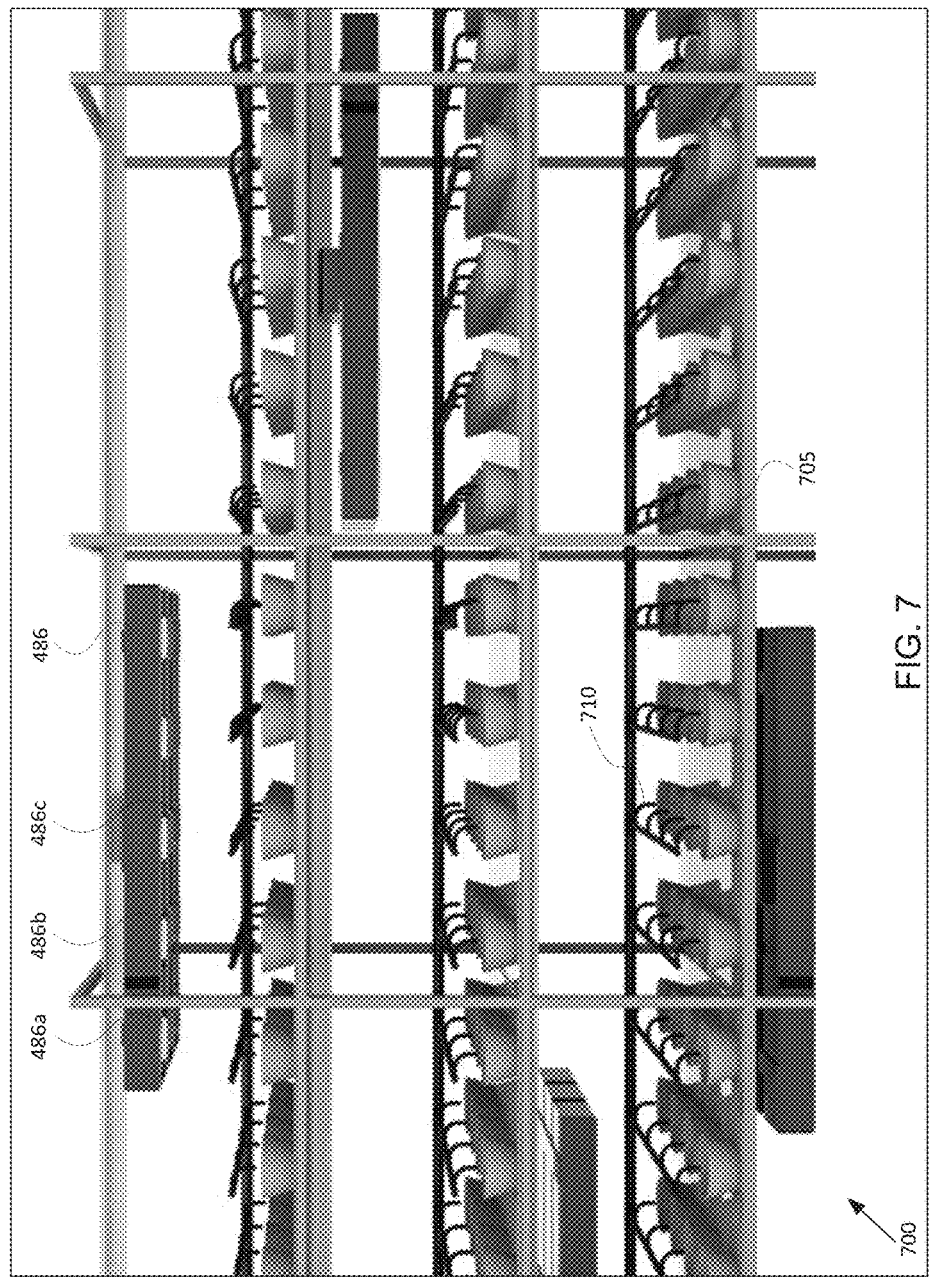
Figure 8:
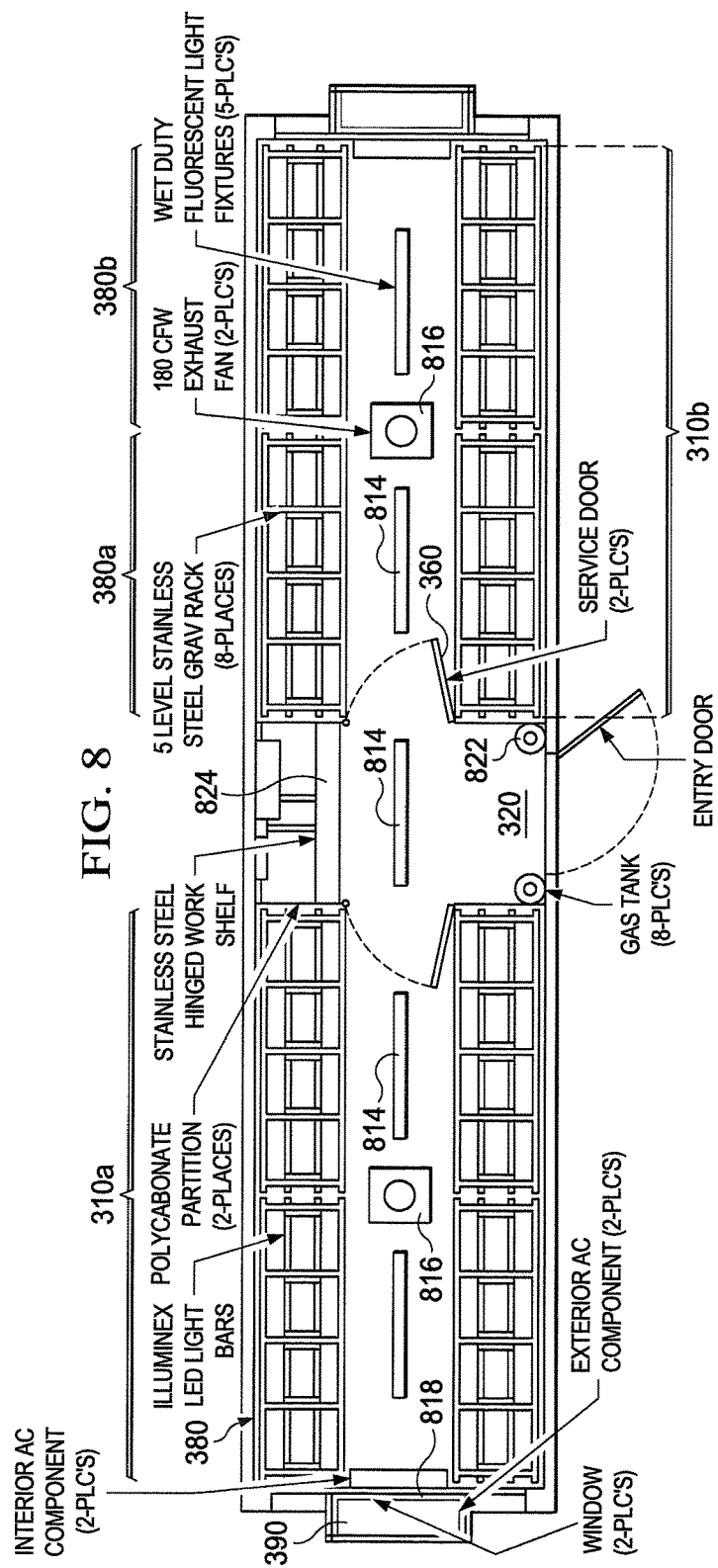
Figure 9:
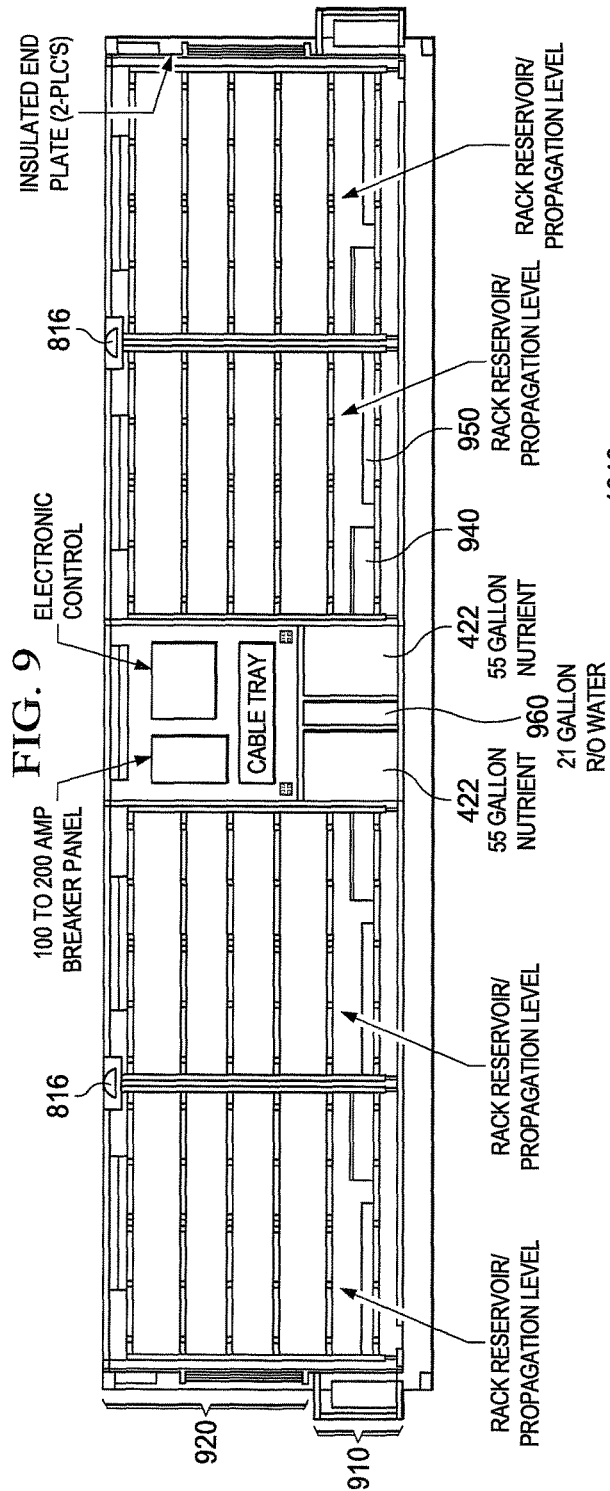
Figure 10:
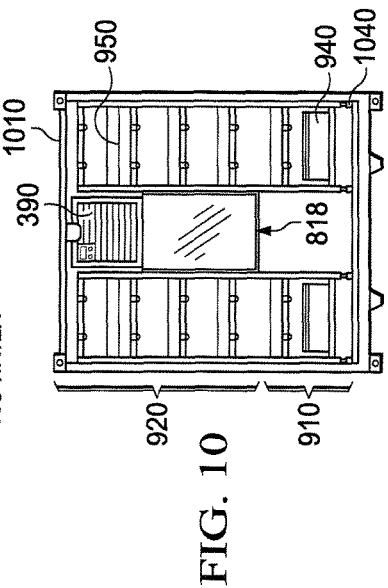

FIGS. 3 through 10 illustrate the interiors of example containers and associated components according to this disclosure. In particular, FIG. 3 illustrates an isometric view of an interior 300 of the container 200. FIG. 4 illustrates a side view of the interior 300 of the container 200. FIGS. 5 and 6 illustrate an example rack system 380 implementing a controllable photoperiod method within the container 200, and FIG. 7 illustrates an example irrigation system 700 within the container 200. FIGS. 8 through 10 illustrate additional details regarding the interior 300 of the container 200.

As illustrated in FIG. 3, the interior 300 of the container includes one or more controllable environment chambers 310a-310b and a utility compartment 320. The interior 300 also includes a bottom 330 (i.e., floor), which could be formed by the bottom cover 210 of the container 200 or by an additional structure placed over the bottom cover 210 of the container 200. The interior 300 further includes a plurality of interior side walls 340 and dividing walls 350. The various walls, floors, and other surfaces within the interior 300 of the container could be formed using insulative material, such as a double wall polycarbonate material.

The dividing walls 350 separate the controllable environment chambers 310a-310b from the utility compartment 320, although a dividing wall could also separate adjacent controllable environment chambers or other areas within the container. A dividing wall separating the controllable environment chambers 310a-310b from the utility compartment 320 creates a barrier against pests and diseases in the chambers 310a-310b in that the utility compartment 320 includes an entrance from outside the container 200 while the chambers 310a-310b do not include an entrance from outside the container 200. In other embodiments, the interior 300 does not include a dividing wall 350, and the container includes one controllable environment chamber.

As can be seen in FIG. 3, each dividing wall 350 includes a doorway 360. The doorway 360 includes a door frame 370 and a door (not shown) attached to the door frame 370, such as by a plurality of hinges. When the door is closed, the door can be sealed to prevent the transfer of air, heat, light, or other components into or out of an environment chamber. In other embodiments, the dividing wall 350 of each chamber 310a-310b may not include a doorway 360, and an entrance to that chamber is provided through an exterior door (such as door 240). Also, in other embodiments, the interior 300 may not include a utility compartment 320, and the equipment of the utility compartment 320 can be housed within one or more of the chambers or outside of the container 200. Although certain details will be provided with reference to the components of the interior 300 of the container as shown in FIG. 3, it should be understood that other embodiments may include more, less, or different components.

Each controllable environment chamber 310a-310b includes one or more rack systems 380 and an HVAC unit 390. In the example shown in FIG. 3, each chamber 310a-310b includes four rack systems 380, namely two side-by-side rack systems 380 on opposite sides of the chamber. Of course, other numbers and arrangements of rack systems 380 could be used in each chamber. Details of an example rack system 380 are provided below. Each chamber 310a-310b may conform to at least one of the many standards for "Approved Greenhouses," such as Animal and Plant Health Inspection Service (APHIS) standards.

Chamber Interior

As shown in FIG. 4, each rack system 380 in the chambers 310a-310b includes one or more layers 482 (such as shelves) for plants to grow on top, under, or within the layer. Each layer 482 supports a plurality of plants growing within the chamber. In this example, the plants can be arranged in an array of rows and columns. The height(s) of the plant(s) to be grown in the rack system 380 can determine the spacing between adjacent layers 482. In some embodiments, the rack system 380 has a total height of eight feet, a total length of eight feet, and a width of up to thirty inches. Each layer 482 can be easily connected to or disconnected from horizontal shelf supports of the rack system 380 in order to alter the number of layers 482 in the rack system 380. In particular embodiments, each rack system 380 includes six layers 482.

A rack system 380 also includes a horizontal light track 484 above each layer 482. Each horizontal light track 484 can be coupled to at least one light source 486, which provides illumination to at least part of the associated layer 482. The light source 486 can support a fully adjustable spectrum, such as through the use of one or more light-emitting diodes (LEDs) and an LED controller. Example light sources 486 include ILLUMITEX ECLIPSE LED fixtures and SUREXI LED chips. The light sources 486 can create LED-based light content tailored to the optimal needs of specific plant species. By combining custom wavelength combinations, the light sources 486 can be used to virtually alter the photosynthesis or photomorphogenesis responses of target plants. The altered photosynthesis or photomorphogenesis responses provide substantially more robust growth in less time. A light source 486 could include electrical connectors such as insulation displacement connectors (IDCs) to provide "plug-and-play" type installation. In particular embodiments, each level 482 of the rack system 380 can contain from eight to twelve full-spectrum ILLUMITEX ECLIPSE LED fixtures with each fixture containing twelve SUREXI LED chips. The number of LED fixtures on each level 482 of the rack depends on the length and width of the rack 380, and the type of light generated by the light source 486 can vary depending on the type of plants being grown. Each LED fixture could contain various other components, such as an LED controller, LED driver, or power supply.

The light sources 486 are controlled by a control system to generate specified amounts, types, and colors of light. For example, the light sources 486 may receive signals from the control system and produce all of the colors required for optimum photosynthesis (such as red, far red, and blue light). The light that is generated can vary depending on the type(s) of plant(s) being grown in the rack system 380. One or more light sources on a rack system 380 (or in overhead or other fixtures elsewhere in a chamber) could also generate only green light, which may allow a person to see within the chamber without interrupting the plants' normal photoperiod. In particular embodiments, the light sources 486 may be controlled to implement flower initiation or flower inhibition as described below.

A light track 484 may be configured to move at least one light source 486 to change which plants in a layer 482 are being illuminated at any given time. The control system could then control the light track 484 to thereby control movement of the light source 486. Assuming the light source 486 moves at a constant speed, this approach may allow each plant in a layer 482 to receive approximately twelve hours of illumination. In other embodiments, light sources 486 could be provided across substantially an entire layer 482, and the light sources 486 can be controlled to provide any amount of illumination at any particular point along the layer 482. Also, in other embodiments, a light track 484 can be attached to one or more vertical portions 488 of the rack system 380. The vertical portions 488 of the rack system 380 provide structural support to the light track 484 and the layers 482.

As shown in FIG. 4, the utility compartment or chamber 320 includes various components associated with one or more of the controllable environment chambers 310a-310b. For example, the utility compartment 320 may contain pumps, tanks, and environmental equipment used to control characteristics of the environment in the chambers 310a-310b. In this example, the utility compartment 320 includes tanks 422 that store water to be used to irrigate plants within one or more of the chambers 310a-310b. The tanks 422 could also store nutrients delivered to the plants within one or more of the chambers 310a-310b. In particular embodiments, each chamber has its own tank 422, and that tank 422 stores water and dissolved nutrients for the plants growing in that chamber. Although not shown in FIG. 4, an additional tank could be used to store distilled water reclaimed from various HVAC units 390 or dehumidifiers.

The example utility compartment 320 also includes power panels 424 for supplying power to one or more of the chambers 310a-310b. The power panels 424 could include components such as circuit breakers, relays, and other electrical components for controlling the flow of electricity. The power panels 424 could also include components for converting or transforming electrical energy, such as when solar panels are used to power the container 200. The utility compartment 320 further includes a control system 426 for controlling the operations within the container 200. As noted above, however, the equipment and components within the utility area 320 could be disposed within one or more of the chambers 310a-310b or even outside of the container 200, and the control system 426 could be implemented remote from the container 200.

The utility compartment 320 can store any number of tanks 422. The number of tanks 422 could vary, for example, depending on the number of chambers receiving water from the utility compartment 320. Some or all chambers may implement irrigation systems that do not require external storage of water, which can reduce or eliminate the number of tanks 422 needed. One or more tanks 422 can generally store any suitable materials used in the container 200, such as unsterilized water, sterilized water, plant nutrients, or water enriched with nutrients. In particular embodiments, each tank 422 is coupled to and in fluid communication with other components within the interior 300, such as a sterilization module, irrigation system, or HVAC unit.

The utility compartment 320 may further include various components associated with controlling or excluding entrants (such as insects or other pests) that may alter the controlled environment of the chambers 310a-310b. For example, the entrance area of the utility compartment 320 could include foot sterilization, such as a walk-through sterilizing foot bath. Clothing and shoes can be a medium for carrying disease organisms and insects from place to place and into a chamber 310a-310b. Sterilization of feet or shoes can help to reduce infiltration of unwanted organisms into the chambers 310a-310b. The utility compartment 320 can therefore be used to establish a barrier against pests and diseases entering the chambers 310a-310b. For that reason, the utility compartment 320 may be referred to as an insect exclusion area.

Example of Sub-Environments: Array of Pods

FIGS. 5 and 6 illustrate additional details of the rack system 380, which implements a photoperiod method within each row-column space of the rack system 380. The row-column spaces of the rack system 380 define different sub-environment or "pod" spaces (i.e., controllable sub-environments). Different types of plants can be grown in different sub-environments of the same rack system 380, or an entire rack system 380 could be used to grow the same type of plant.

In general, multiple or all pods in the same chamber 310a-310b can share certain environmental characteristics, such as temperature, indoor air pressure, composition of air, or humidity. At the same time, each pod is associated with its own specified photoperiod, color of light, intensity of light, strobe effect of light, or other characteristic(s), and these characteristics may or may not vary between pods. For example, different pods can have different light and nutrient environments that may or may not be shared with other pods. In particular embodiments, such as in a Nutrient Film Technique (NFT) hydroponic system, one layer 482 can be associated with a specified nutrient content that differs from the nutrient content of another layer 482. As another example, different pods could be associated with different types of light sources 486 or different emission spectra from the same or different light sources 486. The light sources 486 could be controlled in any other suitable manner, such as to provide different strobe effects or shadow effects in different pods. When a desired environment in a pod includes a moving light, the pod can be defined to include any portion of the length of a layer 482, allowing a light source 486 to move above the layer 482. Of course, stationary light sources 486 could also be used in a pod. Also note that one layer 482 in the rack system 380 may or may not be designed to block light from other layers.

The light sources 486 in the rack system 380 may or may not vary in length. For example, a light source 486 could be fixed or span the entire length of the rack 380, enabling the light source 486 to provide a fully controllable photoperiod (i.e., 24 hours per day). As shown in FIGS. 5 and 6, the length of the light sources 486 could also span less than the entire length of the rack 380, such as half the length of the rack. In these embodiments, a light source 486 can move along a light track 484, enabling the light source 486 to shine on a portion of the rack 380 disposed beneath the light source 486.

Consider, for example, a layer 482 of the rack system 380 that includes a moveable light source 486 with a length spanning half the length of the rack system 380. When the light source 486 moves continuously and at a constant speed, the entire length of the layer 482 experiences an equal photoperiod (12 hours per 24 hour day). Alternatively, if the light source 486 moves intermittently or at different speeds over different areas of a layer 482, different portions of the layer 482 can experience different photoperiods. Longer or shorter moveable light sources could be used to further vary the photoperiods achievable in different areas of the layer 482.

FIG. 6 illustrates a close-up view of the top of the rack system 380. The rack system 380 includes horizontal portions 487 and vertical portions 488, which are used for maintaining structural integrity of the rack system 380. FIG. 6 also illustrates that in some embodiments, each layer 482 includes a plurality of plant locales 483 configured in a row-column array. When a plant is disposed within a chamber at a locale defined by specific coordinates, the control system can provide a higher-quality controllable environment.

Irrigation System

Each chamber 310a-310b can support the use of one or more systems for water and nutrient recirculation. The water and nutrients used in the container may be contained completely within the container 200 and repeatedly recycled, collected, sterilized, and reused to create a closed environment. In some embodiments, no water is discarded from the container 200. For example, the wastewater generated by the HVAC units 390 or dehumidifiers in the HVAC units 390 can be reclaimed and sterilized into 100% reverse osmosis (RO) mineral free water that is recirculated into the irrigation system of the container 200. In some embodiments, this reclaimed water is used to control the pH of the water in the tanks 422. In particular embodiments, the container 200 includes atmospheric water generator (AWG) water reclamation technology, a water purification system, and water temperature regulation. An example water purification system includes an ultraviolet sterilization module or an ozone sterilization module, such as the BUBBLER 16 water purification system from RECLAIM FILTERS & SYSTEMS. In particular embodiments, all water used in a chamber 310a-310b is treated with ozone ($O_3$) to increase oxygenation.

FIG. 7 illustrates an example irrigation system 700 that can be used to irrigate plants within the rack system 380. The irrigation system 700 can be coupled to at least one tank 422, which could store water enriched with nutrients. The irrigation system 700 delivers water and nutrients to plant pots 705 at the plant locales 483. In this example, the irrigation system 700 represents a controllable drip-irrigation system that supplies a specified amount of water to each plant pot 705. In some embodiments, one or more plant pots 705 include a structural support medium for plant roots. Examples of structural support media include sand, rocks, vermiculite, rockwool, peat, coir, bark, woodchips, sawdust, and soil.

The irrigation system 700 can also include a nutrients control system that monitors and controls the amount of nutrients in the water to be delivered to the plant pots 705 or provided within the structural support media of the pots 705. In some embodiments, the irrigation system 700 can be configured to deliver different amounts of nutrients to different plant locales 483. The irrigation system 700 provides an irrigation port 710 for each plant pot 705 within a chamber. Each irrigation port 710 delivers a specified amount of water to a plant pot.

While shown as a controllable drip-irrigation system, other types of irrigation systems could be used in a container, such as an NFT hydroponic system, an ebb and flood hydroponic system, or other irrigation system suitable for hydroponic or geoponic growth. A container 200 could also include multiple types of irrigation systems to support the growth of a wider range of plants. For example, the chamber 310a might include an NFT hydroponic system, while the chamber 310b might include a geoponic subirrigation system. In still other embodiments, multiple types of irrigation systems could be included within a single chamber 310a-310b.

FIG. 7 also illustrates that a light source 486 can include a plurality of light emitters 486a-486c. In some embodiments, the light source 486 supports a fully-adjustable full spectrum of light. In other words, a controller can control which wavelengths of light are emitted by the light source 486. The wavelengths for a full spectrum include infrared wavelengths, visible wavelengths, and near-ultraviolet wavelengths. Various characteristics of the light can be controlled by the control system 426, such as wavelength, intensity, beam angle, angle of incidence, amount of photosynthetically active radiation (PAR), photoperiod, and/or amount of light emitted during the darkness period of the photoperiod. In particular embodiments, the light emitters 486a-486c could represent red, far red, and blue LEDs.

FIGS. 8 through 10 illustrate additional details regarding the interior of the container 200. FIG. 8 illustrates a top view of the interior 300 of the container 200, FIG. 9 illustrates a side view of the interior 300 of the container 200, and FIG. 10 illustrates a front view of the interior 300 of the container 200. Note that certain components described above may be omitted here for ease of illustration and explanation.

As shown in FIG. 8, each chamber 310a-310b includes an HVAC unit 390, a plurality of rack systems 380, overhead light sources 814, and a vent 816. Each chamber may also include a window 818, which may or may not allow viewing into or out of the chamber. The utility compartment 320 includes, among other things, an overhead light 814, one or more gas tanks 822, and a shelf 824. The gas tanks 822 store gas used to promote plant growth within the chambers 310a-310b. In particular embodiments, the container 200 includes at least one 100-pound carbon dioxide ($CO_2$) tank with a regulator. The amount of carbon dioxide is usually a limiting factor in photosynthesis reactions. Increased exposure to carbon dioxide typically results in higher yields and increased growth and reproduction within plants, provided other growth factors like sunlight and temperature are controlled. For example, an increased supply of carbon dioxide increased plant yields from 22 to 41 percent according to a 1993 study.

In some embodiments, the control system 426 supports the ability to initiate purging of gases within a chamber 310a-310b. For example, the control system 426 could operate the vent 816 and/or HVAC unit 390 of a chamber to remove the gases within the chamber while new gases are being added to the chamber from the tank(s) 822. This may allow, for instance, the control system 426 to purge stale air from a chamber 310a-310b based on carbon dioxide readings or other measurements within the chamber. The new air in the chamber 310a-310b could have a composition that is closer to or at a desired composition compared to the stale air previously in the chamber. In particular embodiments, the gas tanks are mounted outside the container 200, such as on an exterior surface or more particularly next to an HVAC unit 260, 390.

In some embodiments, an HVAC unit 390 is able to blow a strong flow of temperature-controlled air into a chamber 310a-310b so that, when a door of the doorway 360 opens, the strong airflow generates turbulence and reduces opportunities for insects to enter the chamber where the plants are produced. As a result, the HVAC unit 390 can be used to reduce the need for pesticides by blowing out potential entrants that alter the controlled environment of the chamber 310a-310b.

The overhead lights 814 provide light for a person within the container 200 and represent any suitable light sources, such as a fluorescent light fixture or a sky light. In embodiments including a sky light as an overhead light 814, the overhead light 814 can include an electronically-controlled light blocking cover to prevent plant exposure to undesired light from outside the container 200. An overhead light 814 could also include greed LEDs or other structures that can generate light without affecting the photoperiod of plants within the container.

The vents 816 add air to or remove air from the chambers 310a-310b. For example, the vents 816 could be used to inject gas(es) from the tanks 822 into the chambers 310a-310b. Example gases include nitrogen (N), oxygen ($O_2$), carbon dioxide ($CO_2$), argon (Ar), and trace elements. In some embodiments, at least one tank 822 could also store particulate matter for injection into a chamber 310a-310b. Examples of particulate matter include pollen, dust, ash (such as volcanic ash), spores, and sea spray.

As shown in FIGS. 9 and 10, the bottom layer of each rack system 380 can include a propagation area 910, and the upper layers of each rack system 380 can include production areas 920. The propagation areas 910 are designed for inducing seeds to sprout and create seedlings and for rooting cuttings. When a seedling is ready to change environments to mature, the layer containing the seedlings is moved up to a production area 920 on an upper level within the rack system 380. Of course, the propagation areas 910 need not be located on bottom of the rack systems 380, and any number of propagation areas 910 and production areas 920 could be used in each rack system 380.

FIGS. 9 and 10 also illustrate an NFT hydroponic irrigation system, where each propagation area 910 includes one or more water reservoirs 940. Each water reservoir 940 allows water to circulate in an irrigation system within a particular layer 482 of a rack system 380. In particular embodiments, a propagation area 910 includes a housing that creates an enclosed miniature greenhouse on the bottom (or other) level of the rack system 380. The housing can be made of double wall polycarbonate material or other suitable insulating or other material(s). The environment within the miniature greenhouse of the propagation area 910 is separate from the production area 920, so the propagation environment could have different environmental characteristics than the production areas. The environment within the propagation area 910 can be specifically designed and controlled for optimum propagation of seeds. In particular embodiments, NFT channels in the propagation areas 910 can have different sizes or a different configuration than NFT channels in the production areas 920. In some embodiments, the propagation area 910 also includes bottom heat.

Each of the production areas 920 and propagation areas 910 includes one or more trays 950. The trays 950 can also be referred to as NFT troughs, channels, gullies, or gutters. The propagation areas 910 can includes nursery trays 950 for sprouting seeds, while the production areas 920 can include production trays 950 for maturation of crops. The NFT trays 950 support different parts of a plant cycle, where the cycle includes a nursery state, a transformation state, a production state, and a harvest state. Beginning in the nursery state, a tray 950 is within the miniature greenhouse propagation area 910, which grows seeds into seedlings. Next, in the transformation state, the tray 950 is moved out of the propagation area 910 and onto a lower layer within the production area 920. A tray 950 within a production area 920 is called a "production channel." In a harvest state, when the crops in a tray 950 reach a maturation harvest-ready point, that tray 950 can be removed from the container 200 so that the plants can be harvested. After plants have been harvested, the tray 950 can return to the propagation area 910.

In an NFT hydroponic system of irrigation, the trays 950 can be used to allow maximum oxygen at the root zone of plants, removable lids can be used to make cleaning and maintenance easier and faster, and thicker channel walls can be used to resist buckling and maintain shape. In some embodiments, a two-piece tray 950 allows each channel to be cleaned individually and allows each level or each tray in an NFT irrigation system to be isolated, which allows one tray to be disconnected while other trays continue to be irrigated. Each tray in an ebb and flood system can similarly be isolated.

FIG. 9 also illustrates an additional tank 960, which is used to store wastewater generated by the HVAC units 390 or dehumidifiers. Among other things, this water can be used to alter the pH level of water stored in the tanks 422. For example, the control system 426 could add wastewater to a tank 422 to alter the pH level of water in the tank 422.

As shown in FIG. 10, the interior of the chamber includes a perimeter 1010, which can be insulated (such as by using a double wall polycarbonate insulation). In this embodiment, the rack system 380 is mounted on top of a set of wheels 1040. The wheels 1040 can lock to prevent the rack system 380 from rolling around in the container 200 during transit. The wheels 1040 also enable the rack system 380 to be easily moved without heavy lifting. In other embodiments, a rack system 380 is stationary and does not include wheels 1040. In particular embodiments, the rack system 380 is sized so as to allow removal from the container 200, and the wheels 1040 allow such removal without heavy lifting. In other particular embodiments, the rack system 380 is sized so as to occupy a substantial portion of a chamber, which prevents removal from the container 200, and the wheels 1040 allow the rack system 380 to be easily moved within the chamber.

In some embodiments, the container 200 is configured for automated removal and replacement of the rack system 380. For example, the container 200 could include a conveyor belt underneath each rack system 380 for an automated removal of the rack system 380 from the chamber 310a-310b. When the door or doors of the container are open, an external conveyor belt could be placed in close proximity to the conveyor belt of the container to receive and transport the rack system 380 to a different environment, such as another container or a natural environment. In some embodiments, the container 200 is configured as part of a system of multi-mode plant production, such as a greenhouse mode of plant production.

In some embodiments, the container 200 could be suitably configured to provide an optimal growing environment for a certain stage of growth of a plant. For example, the container 200 could be controlled to provide an environment for growing orange trees from seedlings to young saplings strong enough to endure a natural environment. In a system of containers, one container could be suitably configured to grow orange trees from seeds to first year saplings, and a second container could be suitably configured to grow orange trees from 1-4 years old. The two or more containers could be coupled such that a rack system in a first container could be moved into the second container by automation. As a specific example, in Florida (an area where a natural disaster like a hurricane or hard freeze could destroy an orange orchard), one or more containers could be used to produce orange tree saplings of various stages of maturation. If a hurricane hits and ruins an orchard, the saplings could be removed from the container (such as by automation) and readily planted in the ground of the orchard as replacements for the destroyed trees. An orange orchard with a system of containers 200 that produce saplings could therefore recover more quickly and produce market-ready oranges than another orchard that replaces destroyed trees with seeds.

Control System

Figure 11A:
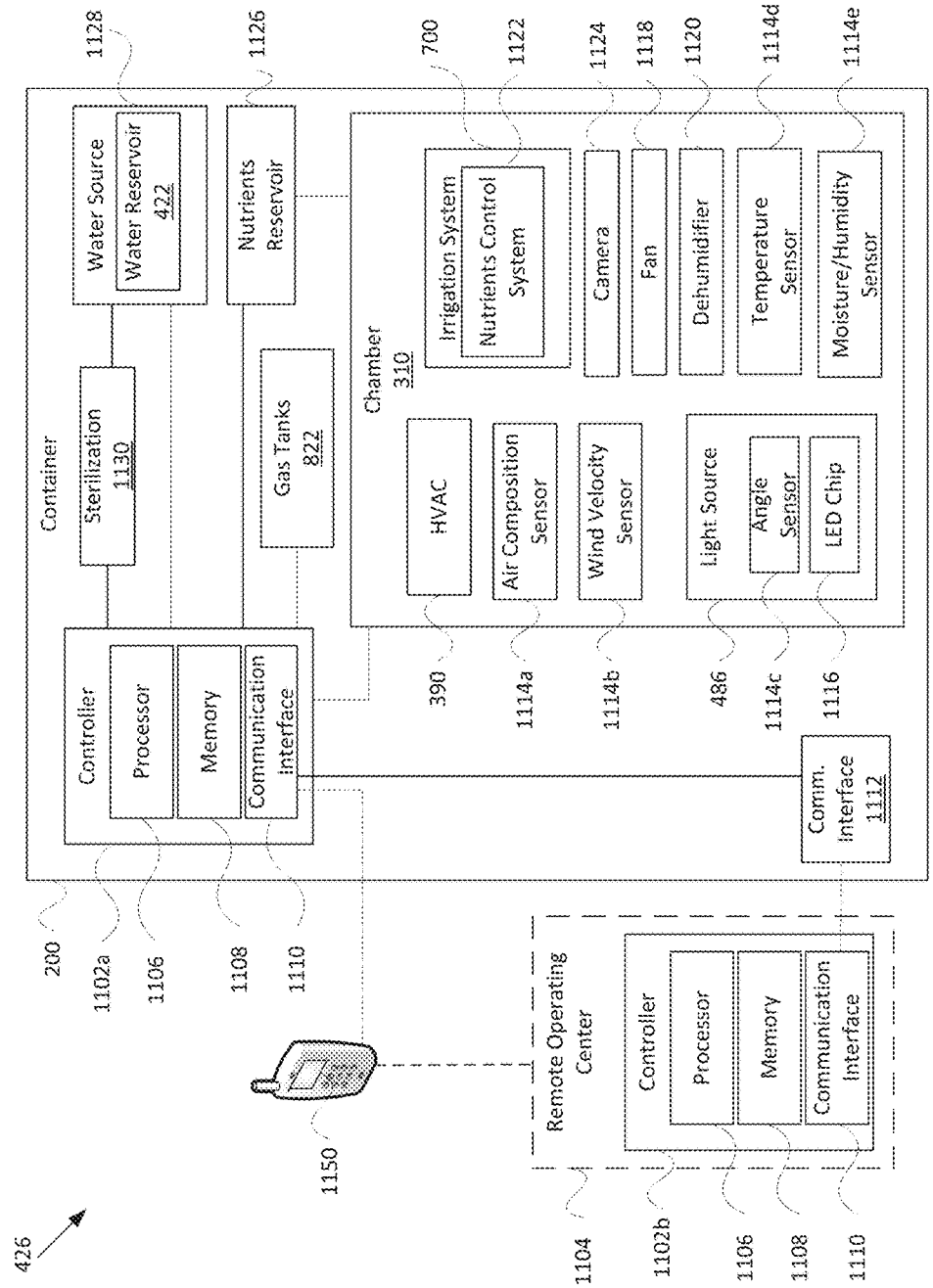
FIGS. 11A and 11B illustrate examples of a control system that controls one or more environments within a container according to this disclosure.
Figure 11B:
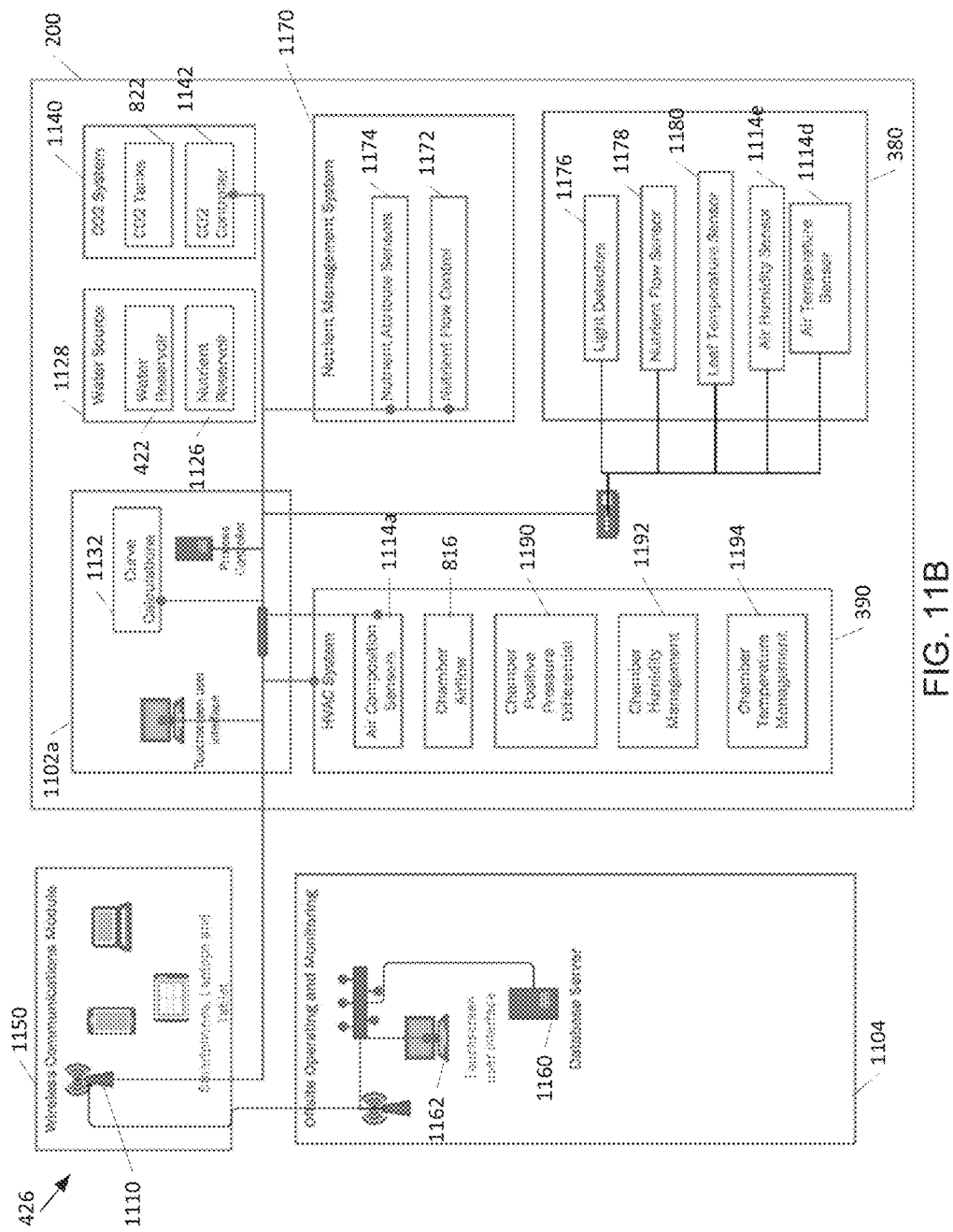

FIGS. 11A and 11B illustrate examples of a control system 426 that controls one or more environments within a container according to this disclosure. As shown in FIG. 11A, the control system 426 can be implemented using a controller 1102a disposed within the container 200 and/or a controller 1102b disposed in a remote location, such as at a remote operating center 1104. Although certain details will be provided with reference to the components of the control system 426, it should be understood that other embodiments may include more, less, or different components. Also note that if multiple controllers 1102a-1102b are used, any suitable functional division can be used to divide operations between those controllers.

Each of the controllers 1102a-1102b is configured to perform various functions to control the characteristics within the chamber(s) of the container 200. For example, each controller 1102a-1102b could execute instructions for controlling the light, humidity, irrigation, air composition, and other characteristic(s) in the chambers of the container 200. Each controller 1102a-1102b includes any suitable structure for controlling one or more operations of a growing container. For example, each controller could include at least one processing device 1106, such as a microprocessor, microcontroller, digital signal processor, application specific integrated circuit, field programmable gate array, or other computing or processing device. Each controller could also include at least one memory 1108 that stores instructions and data used, generated, or collected by the processing device(s) 1106, such as a volatile and/or non-volatile storage and retrieval device(s). Each controller further includes at least one communication interface 1110 that supports communication over one or more wired or wireless links. An additional communication interface 1112 could be used to facilitate communication between the container 200 and the remote operating center 1104.

In some embodiments, each controller 1102a, 1102b monitors and controls at least one environment, possibly having a plurality of sub-environments, within a container 200. For example, monitoring an environment may include measuring characteristics of the environment according to a specified monitoring frequency. The controller can be configured to send a signal to a monitoring device, causing the monitoring device to sense an environmental characteristic and report the measured characteristic to the controller. In other embodiments, the monitoring device could be designed to send measurements to the controller without waiting for signals from the controller. The controller 1102a, 1102b can be coupled to a plurality of monitoring devices disposed within the container 200. Any suitable environmental characteristics can be monitored, such as measurements associated with the air within a chamber, the nutrients within nutrient delivery mechanisms, the light from a light source, and the quality of water. The controller 1102a, 1102b sends a notice to alarm a user regarding any deficiency or malfunction that may cause the controlled environment to deviate from duplicating a successful production, namely successfully implementing a growth recipe.

One example environment where a remote operating center 1104 can be used is a corporation or other entity operating multiple containers 200 that produce the same crop. The entity may take advantage of economies of scale to create an identical environment within a plurality of containers 200. In such embodiments, the controller 1102b is configured to control the environments within the plurality of containers 200. The entity may then monitor the characteristics of the environments within the containers, run experiments and tests within one or more containers, and compare results to an untested container. The entity may implement a centralized database within the remote operating center 1104 to store information related to the environmental characteristics and crop growth patterns within the containers. The entity could also grow different crops in different containers 200, and the same control system (such as controller 1102b) or different control systems could be used to control the environments within the chambers of the containers 200.

As shown in FIG. 11A, the control system 426 includes a plurality of monitoring devices 1114a-1114e disposed within the container 200 and configured to measure characteristics of the controllable environments) and/or to measure a status of the equipment and components within the container 200. For example, the composition of air is measured by one or more air composition sensors 1114a. The sensors 1114a could measure a parts per million (ppm) of certain gasses in the air, such as nitrogen, oxygen, carbon dioxide, argon, and trace elements. In some embodiments, one or more of the air composition sensors 1114a also measure a composition of particulate matter in the air, such as a composition of pollen, dust, ash, spores, and sea spray. The controller can use the measured composition of air in a chamber to control gas tanks 822, thereby altering the gas and/or particulate composition in the chamber.

At least one wind velocity sensor 1114b is configured to measure a speed of air moving within a chamber. In response, the controller 1102a-1102b can be configured to control a fan 1118 to alter the speed of the circulating air. In some embodiments, the fan 1118 includes a ceiling mounted fan. In particular embodiments, the controlled environment of the chambers 310a-310b includes a "positive pressure environment" where the door of the doorway 360 opens into the utility compartment 320, an HVAC turns on and off as necessary for temperature control, and the fan 1118 runs continuously (24 hours per day, 7 days per week).

At least one angle sensor 1114c measures the beam angle of light directed at a plant pot 705 or other location within a chamber. The beam angle is characteristic of the quality of emissions from a light source 486. Other characteristics that can be measured by the sensors 1114c include a color spectrum, an intensity of light, or a strobe effect. The light source 486 includes a control chip 1116, which can be used to alter the light emitted by the light source 486 (based on signals from the controller 1102a-1102b). The light source 486 may include one or more sensors to measure an amount of PAR of the light emitted.

The controller 1102a-1102b could receive input from any number of other or additional sensors and control any number of other or additional actuators within a chamber. For example, the controller 1102a-1102b could receive signals from a timer to turn lights on or off, to dim the light, or control another characteristic of the light. For example, the controller 1102a-1102b could implement a thermostat function, such as to receive measurements from a temperature sensor 1114d within a chamber and adjust the HVAC unit 390 in response.

As another example, the controller 1102a-1102b could receive measurements from a moisture sensor 1114e and control the irrigation system 700 in response, or the controller 1102a-1102b could receive measurements from a humidity sensor 1114e and control a dehumidifier 1120 in response. The controller 1102a-1102b could receive measurements from an acidity-basicity (pH) sensor and control hydro pumps and valves in response. The controller 1102a-1102b could receive signals from the air composition sensors 1114a to open louvers, to vary a speed of a fan, or to exchange or purge air before the carbon dioxide tanks inject gas.

The controller 1102a-1102b could receive measurements from a nutrients sensor and use a nutrients control system 1122 to adjust the nutrients in the water or other delivery medium provided by the irrigation system 700. For example, the controller 1102a-1102b could receive signals from a water level sensor to turn hydro pumps on or off. As a particular example, the nutrients control system 1122 could control the nutrients dissolved (also referred to as total dissolved solids or "TDS") in water within the tanks 422, where that water is then supplied to the plants in the chambers. Any suitable nutrients control system 1122 could be used, such as a miniature "dosatron" or other device that can controllably dispense nutrients into a delivery medium. The nutrients can be stored in a reservoir 1126. The nutrients control system 1122 may also be configured to send signals to the controller 1102a-1102b indicating a composition of the nutrients within the water or other delivery medium. The nutrients control system 1122 may be configured to determine an amount of nutrients in water based on measurements received from an electric conductivity (EC) sensor. In some embodiments, each rack system 380 includes a corresponding nutrient control system 1122.

The controller 1102a, 1102b can also receive input from one or more cameras 1124 in a chamber 310a-310b. The camera 1124 could include a video camera communicably coupled to the Internet (namely, a webcam) and mounted or fixed above each side of the door of the doorway 360. For example, the camera 1124 on the right side of the door can face the rack system 380 on the right side of the chamber 310a, and the camera 1124 on the left side of the door can face the rack system 380 on the left side of the chamber 310a. In some embodiments, cameras 1124 are mounted above or on each side of the HVAC unit 390, and a chamber 310a-310b can include four webcams. The images captured by the camera 1124 are sent to the controller memory 1108 or a display of a mobile device 1150 to be viewed by a user.

A sterilization module 1130 is used to sterilize water or other materials in the container 200. For example, the sterilization module 1130 can be used to sterilize water or nutrients in order to remove pathogens and fungus spores. The sterilization module 1130 may receive signals from the controller 1102a-1102b to initiate a sterilization process according to a time period or at a specified time. In some embodiments, the sterilization module 1130 includes an ultraviolet sterilization module or an ozone sterilization module, such as a BUBBLER 16 water purification system from RECLAIM FILTERS & SYSTEMS.

The control system 426 can interact with one or more users in any suitable manner. For example, the control system 426 could interact with users at the remote operating center 1104, such as via a web-based interface. The control system 426 could also interact with users via one or more mobile devices 1150, such as mobile telephones or smartphones. This may allow, for example, the control system 426 to receive instructions and to provide warnings, zone alarm system notifications, reports (such as measurements of environmental characteristics), repeatable event logs (such as daily, weekly, or monthly logs), or other information to users in various locations.

As shown in FIG. 11B, a centralized database 1160 can be stored on a database server. In some embodiments, the database 1160 of the remote operating center 1104 can be stored in the memory 1108 of the controller 1102b or in a memory coupled to the controller 1102a, 1102b. The database 1160 can be web-based (also referred to as cloud-based) and be controlled via the web-based interface described above. Examples of web-based interface databases include a MICROSOFT ACCESS web application on a MICROSOFT SHAREPOINT site a virtual machine server such as AMAZON S3, MICROSOFT Azure hosting an instance of an SQL Server, or an ORACLE or SAP Software as a Service (SaaS) on an end-user mobile device 1150. A workstation of the utility compartment 320 can include a tablet computer used to record readings for nutrients and growth. The readings can be uploaded to a database, and the information in the database can be used to generate key performance indicator (KPI) reports. As an example of using the database, a user can record a total dissolved solids (TDS) reading for each tank 422 of nutrients using a mobile device 1150 (such as a tablet computer).

Periodically (such as weekly), a user can record growth measurements of plants on the mobile device 1150. Routinely (such as semiweekly), the nitrogen-phosphorus-potassium (NPK) levels of the tanks 422 of nutrients can be confirmed using a test kit, and the nutrient amounts are adjusted as needed in response to the test results. In certain circumstances, a purge and replace technique is used for the tanks 422 of nutrients. According to the purge and replace technique, the nutrients in the tank 422 are emptied and replaced by a correct amount of nutrients.

FIG. 11B also illustrates an example of the control system 426 where the water source 1128 includes the nutrient reservoir 1126 and the container 200 includes a controller 1102a, an HVAC system 390, one or more rack systems 380, a $CO_2$ system 1140, a nutrient management system 1170, and a water source 1128. In some embodiments, the controller 1102a within the container 200 can include a touchscreen user interface, a process controller (such as a programmable logic controller or other processing circuitry within the container 200), and a memory that stores curve calculations 1132 (described more particularly below in reference to FIG. 15).

The $CO_2$ system 1140 includes a $CO_2$ controller 1142 that controls the amount of $CO_2$ in the container 200 and the amount distributed to plants of a particular rack system 380. The $CO_2$ system 1140 includes the gas tanks 822 that contain $CO_2$. The $CO_2$ controller 1142 controls actuators (such as valves) that release $CO_2$ from the $CO_2$ gas tanks 822. For example, the $CO_2$ controller 1142 can send signals to the controller 1102a indicating the control signals sent or to be sent to the $CO_2$ tanks 822.

The nutrient management system 1170 includes a nutrient flow control 1172 that monitors and controls the flow of nutrients to plants in the container 200. The nutrient management system 1170 includes nutrient attribute sensors 1174 that measure the amount of nutrients delivered to or retained by plants in the container 200 and reports those measurements to the nutrient flow control 1172. The nutrient management system 1170 could collaborate with the $CO_2$ controller 1142 to monitor and control carbon dioxide as a nutrient.

The rack system includes light detectors 1176, nutrient flow sensors 1178, leaf temperature sensors 1180, air humidity sensors 1114e, and air temperature sensors 1114d. The light detectors 1176 detect and measure the light received by a plant. The light detectors 1176 can measure the amount(s), type(s), and color(s) of light received by plants. The light detectors 1176 can provide feedback to the controller 1102 regarding whether the light received by plants from the light source 486 meets the type(s) of light the light source 486 is instructed to generate. The nutrient flow sensors 1178 measure the flow of nutrients to the plants of a particular rack system 380 and provide those measurements to the controller 1102a. The leaf temperature sensor 1180 measures the temperature of one or more surfaces (such as the top surface) of a leaf and can be mounted to the leaf. The leaf temperature measurements are transmitted to the controller 1102a and can be used in curve calculations 1132.

The HVAC system 390 controls the temperature, pressure, velocity, and moisture levels of the air in the chambers 310a, 310b, and 320. The HVAC system 390 includes air composition sensors 1114a, vent 816 (also referred to as a chamber airflow), a chamber positive pressure differential module 1190 for regulating air pressure, a chamber humidity management module 1192 for regulating humidity, and a chamber temperature management module 1194 for regulating air temperature. The chamber humidity management module 1192 monitors and controls moisture levels in the air of the chamber. The chamber humidity management module 1192 can also add air moisture through the vent 816 and includes the dehumidifier 1120 to remove moisture from the air.

The remote operating center 1104 includes a database server storing the centralized database 1160, a communication interface 1110, and a touchscreen user interface 1162. The touchscreen user interface 1162 can be a desktop computer, laptop computer, tablet computer, or other suitable device. The touchscreen user interface 1162 receives user input and displays information to the user. The touchscreen user interface 1162 enables a user to view or modify the status of the plants and environmental conditions within the container 200. For example, the user may retrieve historical records from the database server 1160, observe the current environmental conditions a particular sub-environment by viewing current measurements from sensors inside the container 200, or modify a characteristic of the environment within a sub environment by changing a setting. As a particular example, the user may observe that the surface temperature of leaves of a plant is too high, and in response change the settings of the HVAC system 390 to decrease the air temperature within the container 200.

As a similar example, a user using the mobile device 1150 (similar to using the touchscreen user interface 1162) may also observe that the surface temperature of leaves of a plant is too high, and in response change the settings of the HVAC system 390 to decrease the air temperature within the container 200. The mobile device 1150 can include one or more smartphones, laptop computers, tablet computers, or other suitable devices. The mobile device 1150 communicates with the electronic components within the container 200 and with the remote operating center 1104 via a communication interface 1110.

One example commercial implementation may include three different containers controlled by a single control system. One container is suitably configured to grow grapes of the Rhone River wineries, a second container is suitably configured to grow grapes of the Tuscany Italy wineries, and a third container is suitably configured to grow grapes of the Napa Valley wineries. In a reduced scale implementation, grapes of all three regions may be grown in a single container that is divided into suitably arranged sub-environments as described above. From the grapes grown in the container, a winery located anywhere in the world could locally create wines using grapes grown in three of the most desirable and very disparate areas of the wine industry.

Method of Controlling Environment

Figure 12:
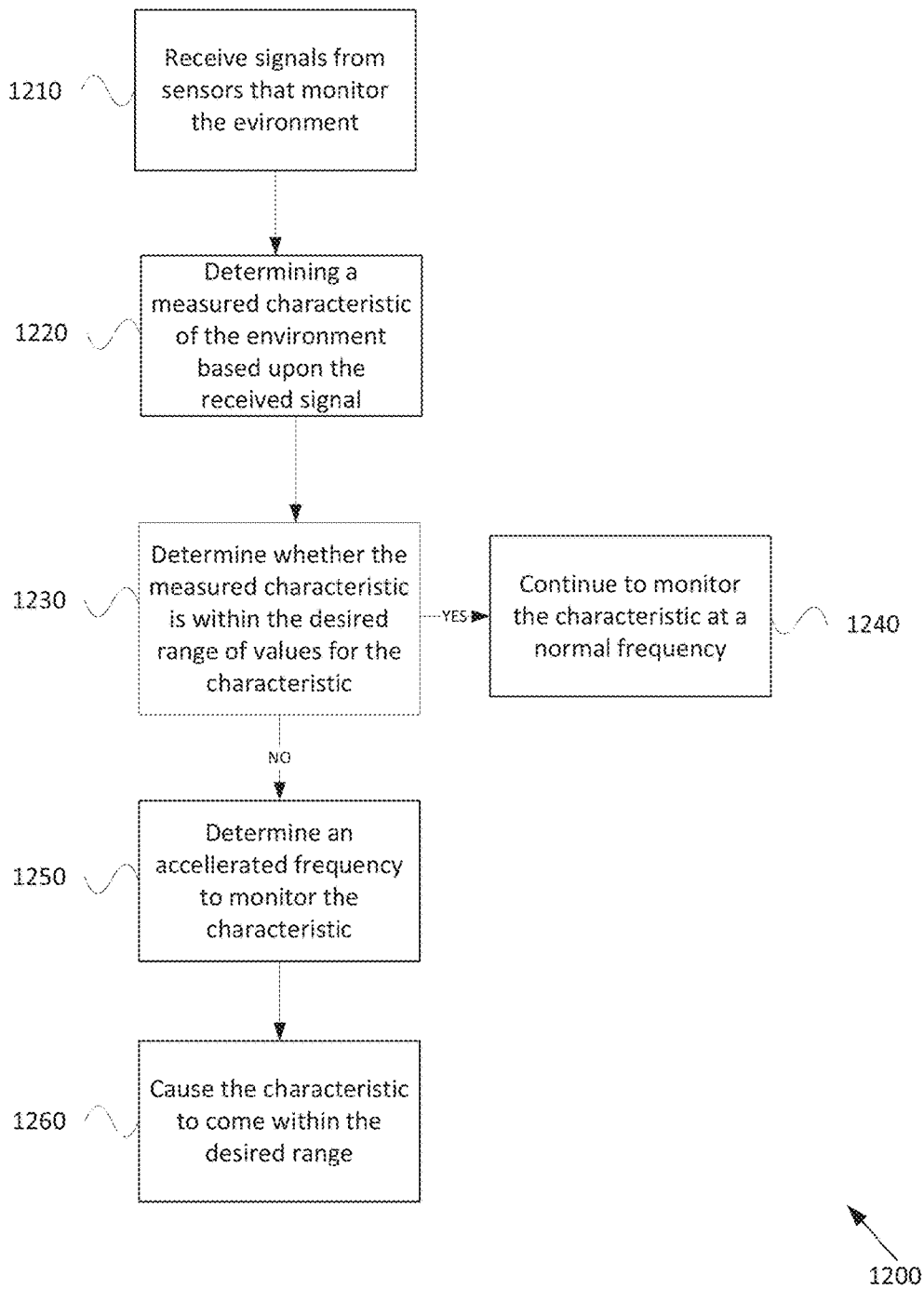
FIG. 12 illustrates an example method for controlling an environment within a chamber according to this disclosure.

FIG. 12 illustrates an example method 1200 for controlling an environment within a chamber according to this disclosure. The embodiment of the method 1200 shown in FIG. 12 is for illustration only. In this example, the method 1200 is executed by the control system 426 associated with the container 200. The method 1200 could be used by any other suitable control system and with any other suitable container.

In block 1210 of the method 1200, a controller receives one or more signals from at least one monitoring device that monitors a controllable environment. For example, the signals could be received from at least one monitoring device (e.g., one or more sensors) that is adapted to measure at least one characteristic of an environment within a controllable environment chamber. The environment can also be a sub-environment of the controllable environment chamber, such as a miniature greenhouse within a propagation area 910 or a production area 920. In block 1220 of the method 1200, the controller determines a measured characteristic of the environment using the signal(s) received from the monitoring device(s).

In block 1230 of the method 1200, the controller determines whether the measured characteristic is within a desired range of values for the characteristic. The desired range of values can be stored within a memory of the controller or received from a user selection input into the control system. In blocks 1240 and 1250 of the method 1200, the controller determines a monitoring frequency at which to monitor the characteristic of the environment using the determination of whether the measured characteristic is within the desired range of values. When the measured characteristic is within the desired range of values, the monitoring frequency represents a normal frequency for the measured characteristic in block 1240. When the measured characteristic is outside the desired range of values, the monitoring frequency represents an accelerated frequency for the measured characteristic in block 1250.

In block 1260 of the method 1200, the controller causes the characteristic to come within the desired range of values. For example, the controller can send signals to one or more components within the container that are configured to adjust the characteristic of the sub-environment or environment within the controlled chamber.

Note that while this disclosure describes the control of an environment in the context of a fully functional centralized control system, those skilled in the art will appreciate that at least portions of the control system described here are capable of being distributed, such as using multiple distributed control devices. Such distributed control systems also fall within the scope of this disclosure.

Method of Controlling Climate

Figure 13:
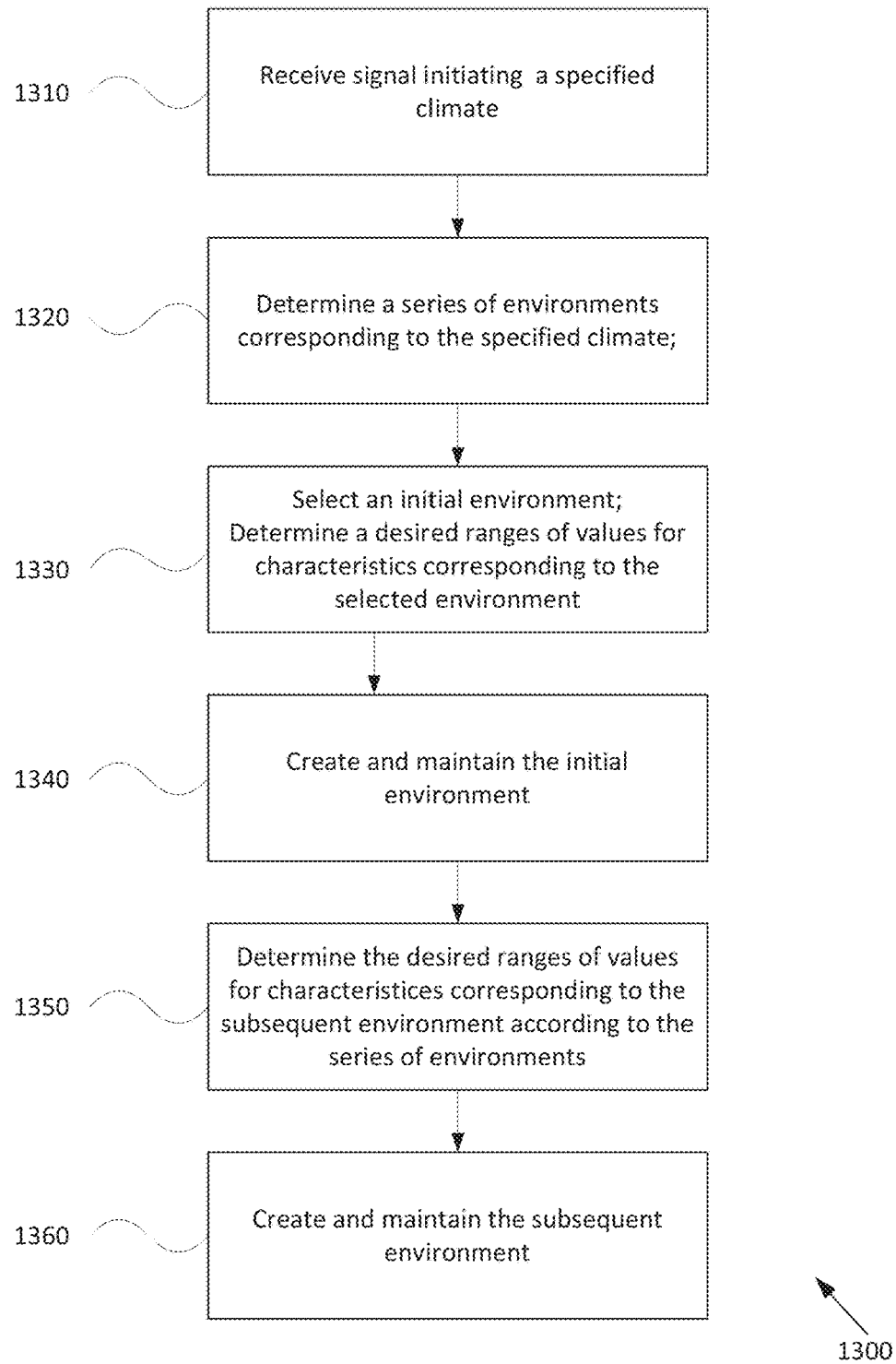
FIG. 13 illustrates an example method for controlling a climate within a chamber according to this disclosure.

FIG. 13 illustrates an example method 1300 for controlling a climate within a chamber according to this disclosure. A "climate" includes a sequence of environments and associated time periods during which the environments are maintained within the sequence. The embodiment of the process 1300 shown in FIG. 13 is for illustration only. In this example, the method 1300 is executed by the control system 426 associated with the container 200. The method 1300 could be used by any other suitable control system and with any other suitable container.

In block 1310 of the method 1300, a controller receives a signal initiating a specified climate for a chamber. In some embodiments, a user selection indicates the specified climate for the chamber. In particular embodiments, the user selection is received from a mobile telephone or other portable device. In block 1320, the controller determines a series of environments that correspond to the specified climate. The instructions to generate the series of environments can be referred to as a growth recipe.

In block 1330 of the method 1300, the controller selects a first environment from the series of environments that make up the specified climate. The first environment corresponds to a first set of environmental characteristics, such as light, humidity, air composition, and temperature. Each of the characteristics in the first set can have a corresponding first desired range of values. In block 1340, the controller creates and maintains the initial environment. This could include the controller implementing the method 1200 of FIG. 12 to create the first environment. During block 1340, the controller causes measured characteristics within the controllable environment to come within the first desired ranges of values.

In block 1350, after the passage of a desired amount of time, the controller determines a second range of desired values for a second environment within the sequence of environments. In block 1350, the controller causes the characteristics of the controllable environment to come within the second desired ranges of values. This could include the controller implementing the method 1200 of FIG. 12 to create the second environment.

Note that while this disclosure describes the control of an environment in the context of a fully functional centralized control system, those skilled in the art will appreciate that at least portions of the control system described here are capable of being distributed, such as using multiple distributed control devices. Such distributed control systems also fall within the scope of this disclosure.

Example of Climate Control: Method of Flowering Inhibition or Initiation

Flowering promotion and inhibition are specific examples of how the method 1300 can be implemented according to this disclosure. The controller creates a climate that includes a sequence of environments, and the environments are created within a period of time to induce a flower to produce or refrain from producing a flowering bud or bloom. For example, the climate for growing an indigo-colored tiger lily includes creating and maintaining an environment $E_1$ for two hours, followed by an environment $E_2$ for thirteen days, followed by ten iterations of alternating environments $E_3$ and $E_4$ for three hours per iteration. Each environment $E_1$, $E_2$, $E_3$, and $E_4$ includes a composition of gases, temperature, humidity, pH level, wind velocity, color spectrum of light, intensity of light, and an amount of PAR within the light.

Example of Climate Control: Climate Replication

Replicating the climate of a chosen region in the world is another example of how the method 1300 can be used. Climate replication can be used to produce plants that are more similar or identical to those found in the chosen region. A specific example of this is using climate replication to reproduce wine grapes that are the same color, flavor and texture as those grown in the chosen region.

In some embodiments, the climatic characteristics of a given region in the world can be monitored over a specified time period, such as during the growing season for one or more years or year-round for one or more years. An analysis could be performed to select the "best" climatic characteristics for achieving desired growth in plants. The desired growth could involve the maximum production of food crops from the plants, the best tasting food crops from the plants, or the largest food crops from the plants. In other embodiments, the climatic characteristics for one year could simply be chosen, or the climatic characteristics from multiple years could be combined (such as by averaging). In any event, the selected climatic characteristics could then be recreated in the chambers of one or more containers, ideally leading to the production of food crops that appear to have been grown in the given region of the world.

As a further example of the wineries, a Texas winery could use one or more containers 200 to grow wine grapes using the climatic characteristics of a vineyard in Napa Valley, Calif. The climatic characteristics could include certain patterns of sunlight, rain, wind, darkness, and temperature. The climatic characteristics could also include specific compositions of water and nutrients and any other or additional characteristic(s). Ideally, this allows the Texas winery to produce grapes that are the same as or substantially similar to those grown in Napa Valley. However, the Texas winery could produce the grapes year-round without having to wait for grapes to be shipped from the vineyard in California. As another particular example of this, the Texas winery could use one or multiple containers 200 to grow wine grapes using the climatic characteristics of vineyards in different regions of the world. The winery could then produce wines using different combinations of grapes, again year-round without having to wait for grapes to be shipped from different regions of the world.

Any suitable characteristics could be measured for a given region of the world, and the characteristics could be measured at any suitable interval or intervals. For example, the interval period could be monthly, weekly, daily, or hourly. The recorded environmental characteristics could include characteristics about the soil, air, water, and light in the region. Characteristics about the soil could include the composition of the soil, soil texture, level of compaction, moisture content, soil temperature, pH level, soil temperature to air temperature ratio, mineral-nutrient content of the soil, and organic matter in the soil. Characteristics about the air could include air temperature, air pressure, humidity, composition of gases, composition of particulate matter, wind velocity, and direction. Characteristics about the water could include water temperature, mineral-nutrient content, source location (such as rising underground water table, rain, or snow pack), frequency of precipitation, and amount of precipitation. Characteristics about the light could include the angle of light shining onto leaves, angle of light shining onto fruit, intensity of light, photoperiod, color spectrum of light, PAR light, and other environmental factors. In environments where natural pollinators (such as birds and bees) are related to crop quality, wind velocity can be used in the container to spread pollen and mimic the effects of natural pollinators within the chamber. Similarly, in environments where natural aerators (such as earthworms) are related to crop quality, the container can include controllable synthetic soil aeration systems. The aerators can operate continuously (namely, 24/7).

Nutrient Film Technique Example Details

Figure 14A:
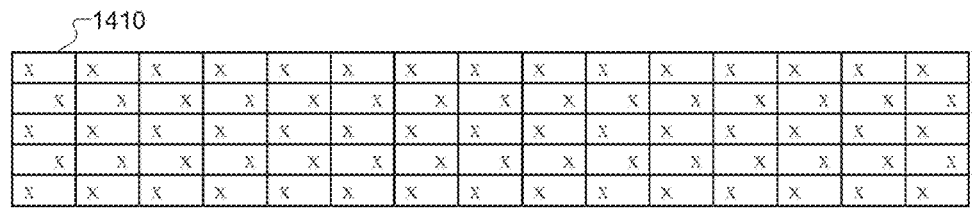
FIGS. 14A and 14B illustrate examples of a Nutrient Film Technique (NFT) rack crop center pattern according to this disclosure.
Figure 14B:
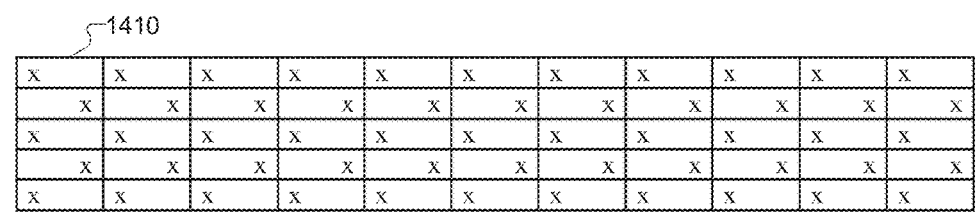

FIGS. 14A and 14B illustrate examples of an NFT rack crop center pattern according to this disclosure. The crop center pattern provides room for lateral growth of the crop. FIGS. 14A and 14B show a top view of an NFT rack 1410 of a certain length that includes an array of crops arranged according to a respective crop center pattern 1400, 1401. More specifically, FIG. 14A illustrates an example NFT rack crop center pattern 1400 for six-inch centers, and FIG. 14B illustrates an example NFT rack crop center pattern 1401 for eight-inch centers.

Holes can be drilled in the NFT rack 1410 for each crop center to grow up through. The array of crops includes a number of rows and columns of plants with the centers spaced a specified distance apart (six inches in FIG. 14A, and eight inches in FIG. 14B). In some embodiments, the length of the NFT rack 1410 is 96 inches. When the crop center pattern includes 6-inch centers, a 96-inch long NFT rack 1410 can have 15-16 holes per row as shown in the crop center pattern 1400. When the crop center pattern includes 8-inch centers, a 96-inch long NFT rack 1410 could have 11 holes per row as shown in the crop center pattern 1401.

Vapor Pressure Deficit Irrigation and Nutrient Control

Figure 15:
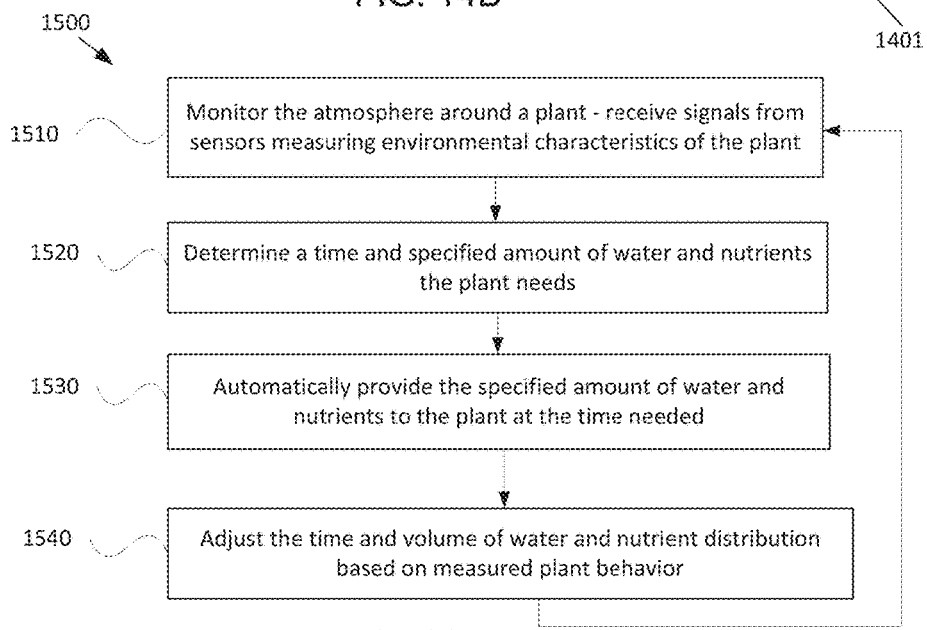
FIG. 15 illustrates an example predictive irrigation algorithm for controlling the delivery of a nutrient solution according to this disclosure.

FIG. 15 illustrates an example predictive irrigation algorithm 1500 for controlling the delivery of a nutrient solution according to this disclosure. The algorithm 1500 can be implemented by the controller 1102a, 1102b for controlling the delivery of nutrient solution in an ebb and flood system based on environmental factors, such as vapor pressure deficit (VPD). As a particular example, the algorithm 1500 could control the provisioning of water and nutrients to an ebb and flood hydroponic system of the controllable irrigation system 700. The algorithm 1500 causes water and nutrients to be delivered to a plant based on the plant's requirements and the environment associated with that plant, rather than based on a predetermined volume and time schedule or a fixed timed event. More specifically, the algorithm 1500 determines the amount of water that a plant needs based on the plant's rate of transpiration, which can be determined based on the current VPD and other environmental factors (such as air movement, leaf surface temperature, solar radiation, and carbon dioxide levels).

The controller 1102a-1102b implementing the predictive irrigation algorithm 1500 monitors the atmosphere around the plant using a sensor in block 1510. For example, the sensor can be an array of sensors including at least one humidity sensor 1114e and at least one temperature sensor 1114d that continually monitor plant conditions. The temperature sensor(s) can be disposed within the air mass of the plant canopy, which is near the surface of leaves of the plant. In some embodiments, a temperature sensor is aspirated and properly positioned within the plant. In particular embodiments, the temperature sensor includes a leaf temperature sensor, which can be mounted on a leaf.

In block 1520, the controller 1102a-1102b implementing the predictive irrigation algorithm 1500 determines a specified amount of water that a plant needs and a corresponding time that the plant needs water based on a calculated VPD (which could be measured in millibars) and other environmental measurements from the sensors. That is, the predictive irrigation algorithm 1500 calculates the current VPD of the surrounding environment of a plant. Though the calculated VPD is not a measure of plant stress, current VPD is a good indicator of crop stress and can be used to determine current or accumulated plant evaporation potential. As an indicator of plant stress, the current VPD value indicates whether a plant is experiencing excessive transpiration or an inability to transpire adequately. The stress of water loss indicated by the VPD value is a factor for determining a specified amount of water that the plant needs and the mode of irrigation delivery needed (such as via pulses of fog or mist).

In some embodiments, the predictive irrigation algorithm 1500 calculates a target range of VPD values to be established and maintained for the plant, such as between 4.2 and 14. The target VPD range can vary according to the plant species and stage of growth. Also, the target VPD range can vary throughout the day or throughout the plant cycle according to diurnal (such as daily) set points or multi-day set point schedules. Among other things, the controller 1102a-1102b implementing the predictive irrigation algorithm 1500 can use the target VPD range to control the HVAC 390. A plant can actively affect its surrounding air mass, and the plant is affected by changes in this same air mass. When a plant increases its rate of transpiration, a local decrease in VPD occurs as the surrounding air absorbs the evaporated moisture. The process of water evaporation absorbs a head and causes a cooling effect, which further reduces the capacity of the air mass to hold water and further lowers the VPD. If the current VPD is extremely low, water can condense out of the air onto leaves, fruit, and other plant parts, providing a medium for fungal growth and disease. If the current VPD is too low compared to the target VPD range, the VPD can be increased by removing moisture from the air or increasing the air's moisture holding capacity. The HVAC 390 can be used to increase the VPD while reducing the air moisture level by increasing the temperature and by replacing moist air with drier air. The dehumidifier 1120 can also be used to remove moisture. If the current VPD is too high compared to the target VPD range, the controller 1102a-1102b implementing the predictive irrigation algorithm 1500 can instruct the irrigation system (such as a sprinkler, fogger, or misting equipment) to add water vapor to the air, which at the same time cools the air through evaporation.

In block 1530, at the determined time for delivery, the controller 1102a-1102b implementing the predictive irrigation algorithm 1500 automatically provides the specified amount of water to the plant (block 1530). This can be done automatically without human intervention.

Plants need less water while young and more water as they grow. In block 1540, as the plant grows, the predictive irrigation algorithm 1500 changes the frequency and duration of ebbing and flooding. That is, as the plant grows, the ebb and flood trays receive water more frequently and/or the length of time the water remains in the ebb and flood tray increases. The volume and time for distribution of water and nutrients to the plant can be based on the plant's size, growth, and metabolism behavior within specific environmental parameters. The plant size, growth, and metabolism versus the specific environmental parameters can be plotted on a graph, resulting in a unique curve. The unique curve can be used to optimize crop production within a chamber 310a-310b. Over-watering and over-feeding occurs when plants are watered and fed nutrients based on time schedules and fixed volume prescriptions. The unique curves associated with different plants can be used to reduce or eliminate these problems.

Although various features have been shown in the figures and described above, various changes may be made to the figures. For example, the size, shape, arrangement, and layout of components shown in FIGS. 1 through 11, 14A, and 14B are for illustration only. Each component could have any suitable size, shape, and dimensions, and multiple components could have any suitable arrangement and layout. Also, various components in FIGS. 1 through 11, 14A, and 14B could be combined, further subdivided, or omitted and additional components could be added according to particular needs. Further, each component in a device or system could be implemented using any suitable structure(s) for performing the described function(s). In addition, while FIGS. 12, 13, and 15 illustrate various series of steps, various steps in FIGS. 12, 13, and 15 could overlap, occur in parallel, occur multiple times, or occur in a different order.

Moreover, this disclosure has described various embodiments that use a shipping container, such as a repurposed cargo shipping container, to implement one or more self-sustaining artificially controllable environments and vertical farming. However, this disclosure is not limited to use of shipping containers. Any other suitable three dimensional (3D) enclosed space could be used to implement one or more self-sustaining artificially controllable environments and vertical farming. Other examples of enclosed spaces that could be used include warehouses, basements, train box cars, or other enclosures that at least partially reduce or prevent the penetration of sunlight or other environment characteristic(s) from the enclosed space(s).

In some embodiments, various functions described above (such as those of the control system) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later over-written, such as a rewritable optical disc or an erasable memory device.

Although example embodiments of this disclosure have been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element, which must be included in the claim scope; the scope of patented subject matter is defined only by the allowed claims. Moreover, none of these claims is intended to invoke paragraph six of 35 U.S.C. § 112 unless the exact words "means for" or "step for" are followed by a participle.

What is claimed is:

1. A system comprising:
    an enclosed space defining a controllable environment chamber;
    at least one monitoring device configured to measure multiple characteristics of an environment within the chamber;
    one or more light sources disposed within the chamber and configured to provide illumination within the chamber;
    multiple actuators configured to alter the characteristics of the environment within the chamber; and
    a control system configured to (i) receive from a user a selection of a climate of a specified region of the world, (ii) determine a sequence of environments over time that comprise the selected climate, and (iii) based on the determined sequence, control operation of the actuators to replicate the sequence of environments within the chamber such that a climate within the chamber replicates the selected climate;
    wherein the enclosed space comprises at least one rack system configured to be placed within the enclosed space, each rack system comprising multiple layers configured to receive multiple plants to be grown in the chamber;
    wherein the actuators are configured to adjust the characteristics of the environment within the chamber to condition the environment based on a type and behavior of the plants to be grown in the chamber;
    wherein at least one of the actuators is configured to automatically move at least one of the one or more light sources with respect to a location of one or more plants within the chamber; and
    wherein the at least one monitoring device comprises a wind velocity sensor configured to measure a speed of air moving within the chamber around at least one of the plants, wherein in response to the measured speed of the air, the control system is further configured to control a fan to alter the speed of the air.

2. The system of claim 1, wherein the control system is further configured to use measurements of the characteristics to control operation of the actuators based on the type and behavior of the plants to be grown in the chamber.

3. The system of claim 2, wherein the control system is further configured to:
    determine a rate of transpiration of the plants to be grown in the chamber; and
    control the operation of the actuators based on the determined rate of transpiration.

4. The system of claim 1, wherein the enclosed space comprises at least two controllable environment chambers and a utility compartment, the utility compartment containing the control system.

5. The system of claim 4, wherein the control system is configured to adjust one or more characteristics of the environment in one controllable environment chamber independently of one or more characteristics of the environment in another controllable environment chamber.

6. The system of claim 1, wherein the control system is configured to adjust one or more characteristics of one sub-environment within the controllable environment chamber independently of one or more characteristics of another sub-environment within the controllable environment chamber.

7. The system of claim 1, wherein the actuators are configured to adjust temperature, humidity, light, water, nutrients, and gas of the environment within the chamber.

8. The system of claim 1, wherein the actuators comprise:
an irrigation system configured to provide water to the environment within the chamber; and
a nutrients control system configured to control delivery of plant nutrients to the environment within the chamber.

9. The system of claim 8, wherein:
the chamber includes a Nutrient Film Technique (NFT) hydroponic system;
the irrigation system comprises a NFT hydroponic irrigation system; and
the nutrients control system comprises a plurality of NFT trays configured to support different life cycle stages of the multiple plants.

10. The system of claim 1, wherein the actuators comprise:
a gas source configured to provide one or more gases to the environment within the chamber;
a fan configured to move air within the chamber; and
a vent configured to remove air from the chamber.

11. The system of claim 1, wherein the one or more light sources are associated with each layer of each rack system.

12. The system of claim 1, wherein the at least one actuator is configured to move the at least one light source according to an adjustable pattern.

13. The system of claim 1, wherein the enclosed space comprises insulated walls and a sealable door.

14. The system of claim 1, wherein each rack system comprises one or more propagation areas configured to contain smaller seedling plants and one or more production areas configured to contain larger plants.

15. The system of claim 1, further comprising:
at least one sterilization module configured to sterilize at least one of water and nutrients to be provided to the chamber.

16. The system of claim 1, further comprising:
a portable power source configured to provide electrical energy to the at least one monitoring device and the actuators.

17. The system of claim 1, wherein the enclosed space comprises a shipping container.

18. The system of claim 1, wherein the climate in the specified region of the world is different than an ambient climate outside the enclosed space.

19. A method comprising:
obtaining measurements of multiple characteristics of an environment within a controllable environment chamber of an enclosed space, wherein the enclosed space comprises at least one rack system configured to be placed within the enclosed space, each rack system comprising multiple layers configured to receive multiple plants to be grown in the chamber;
adjusting the characteristics of the environment within the chamber based on the measurements using multiple actuators, the multiple actuators configured to adjust the characteristics of the environment within the chamber to condition the environment based on a type and behavior of the plants to be grown in the chamber;
receiving, by a control system from a user, a selection of a climate of a specified region of the world, and
determining a sequence of environments over time that comprise the selected climate;
controlling, by the control system, operation of the actuators to replicate the sequence of environments within the chamber such that a climate within the chamber replicates the selected climate;
moving, using at least one of the multiple actuators, at least one light source with respect to a location of one or more plants within the chamber, the at least one light source being among one or more light sources disposed within the chamber and configured to provide illumination within the chamber; and
measuring a speed of air moving within the chamber around at least one of the plants and, in response to the measured speed of the air, controlling a fan to alter the speed of the air.

20. The method of claim 19, wherein:
the enclosed space comprises at least two controllable environment chambers; and
one or more characteristics of the environment in one controllable environment chamber are adjusted independently of one or more characteristics of the environment in another controllable environment chamber.

21. The method of claim 19, wherein one or more characteristics of one sub-environment within the controllable environment chamber are adjusted independently of one or more characteristics of another sub-environment within the controllable environment chamber.

22. The method of claim 19, wherein controlling operation of the actuators to replicate the sequence of environments comprises:
selecting a first environment within the sequence of environments, the first environment associated with first ranges of values of the characteristics;
adjusting the characteristics of the environment so that the characteristics fall within the first ranges of values;
selecting a second environment within the sequence of environments, the second environment associated with second ranges of values of the characteristics; and
after passage of a specified amount of time, adjusting the characteristics of the environment so that the characteristics fall within the second ranges of values.

23. The method of claim 22, wherein the selection of the climate is received in a first signal from a user device associated with the user.

24. The method of claim 19, wherein the enclosed space comprises a shipping container.

25. The method of claim 19, wherein the actuators are configured to adjust temperature, humidity, light, water, nutrients, and gas of the environment within the chamber.

26. A non-transitory computer readable medium embodying a computer program, the computer program comprising computer readable program code for:
obtaining measurements of multiple characteristics of an environment within a controllable environment chamber of an enclosed space, wherein the enclosed space comprises at least one rack system configured to be placed within the enclosed space, each rack system comprising multiple layers configured to receive multiple plants to be grown in the chamber;
controlling operation of multiple actuators to adjust the characteristics of the environment within the chamber based on the measurements and based on a type and behavior of the plants to be grown in the chamber;

receiving from a user a selection of a climate of a specified region of the world, and determining a sequence of environments over time that comprise the selected climate;

controlling operation of the multiple actuators to replicate the sequence of environments within the chamber such that a climate within the chamber replicates the selected climate;

controlling operation of at least one of the multiple actuators to move at least one light source with respect to a location of one or more plants within the chamber, the at least one light source being among one or more light sources disposed within the chamber and configured to provide illumination within the chamber; and obtaining a measurement of a speed of air moving within the chamber around at least one of the plants and, in response to the measurement of the speed of the air, controlling a fan to alter the speed of the air.

* * * * *